United States Patent
Centonza et al.

(10) Patent No.: US 10,051,515 B2
(45) Date of Patent: Aug. 14, 2018

(54) SIGNALING FOR INTERFERENCE REDUCTION

(71) Applicant: Telefonaktiebolaget L M Ericsson (publ), Stockholm (SE)

(72) Inventors: Angelo Centonza, Winchester (GB); Sairamesh Nammi, Kista (SE); Thomas Chapman, Solna (SE); Muhammad Kazmi, Bromma (SE); Torbjörn Elfström, Fjärås (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 247 days.

(21) Appl. No.: 14/786,091

(22) PCT Filed: Jun. 18, 2015

(86) PCT No.: PCT/SE2015/050715
§ 371 (c)(1),
(2) Date: Oct. 21, 2015

(87) PCT Pub. No.: WO2016/048214
PCT Pub. Date: Mar. 31, 2016

(65) Prior Publication Data
US 2016/0286432 A1      Sep. 29, 2016

Related U.S. Application Data

(60) Provisional application No. 62/055,815, filed on Sep. 26, 2014.

(51) Int. Cl.
*H04W 72/08* (2009.01)
*H04W 52/02* (2009.01)
(Continued)

(52) U.S. Cl.
CPC ......... *H04W 28/04* (2013.01); *H04J 11/0056* (2013.01)

(58) Field of Classification Search
CPC ............... H04W 28/04; H04W 72/082; H04W 52/0206; H04W 72/0426; H04W 28/08;
(Continued)

(56) References Cited

U.S. PATENT DOCUMENTS

| | | |
|---|---|---|
| 2011/0013504 A1 | 1/2011 | Imamura |
| 2014/0187255 A1 | 7/2014 | Dimou et al. |

(Continued)

FOREIGN PATENT DOCUMENTS

CN     102484579 A     5/2012

OTHER PUBLICATIONS

Intel Corporation "Discussion on network assistance information for enhanced IS/IC receivers" *3GPP TSG-RAN WG4 Meeting #68* Barcelona, Spain, Aug. 19-23, 2013 (6 pages).
(Continued)

*Primary Examiner* — Charles C Jiang
*Assistant Examiner* — Vanneilian Lalchinthang
(74) *Attorney, Agent, or Firm* — Sage Patent Group

(57) ABSTRACT

According to some embodiments, a method may be provided at a first network node supporting inter-node interference reduction. The method may include communicating an interference reduction report activation message between the first network node and a second network node. After communicating the interference reduction report activation message, an interference reduction assistance information message may be communicated between the first and second network nodes. After communicating the interference reduction assistance information message, an interference reduction report deactivation message may be communicated between the first and second network nodes.

25 Claims, 12 Drawing Sheets

(51) Int. Cl.
*H04J 11/00* (2006.01)
*H04W 28/04* (2009.01)

(58) Field of Classification Search
CPC ............ H04W 36/0083; H04J 11/0056; H04L 5/0035; H04L 5/0094; H04L 27/2647
USPC .......................................................... 370/328
See application file for complete search history.

(56) References Cited

U.S. PATENT DOCUMENTS

| | | | |
|---|---|---|---|
| 2014/0243002 A1* | 8/2014 | Muruganathan .. | H04W 72/0426 455/450 |
| 2015/0372778 A1* | 12/2015 | Xu ......................... | H04J 11/005 370/329 |
| 2016/0080963 A1* | 3/2016 | Marinier .............. | H04L 5/0053 370/252 |
| 2016/0142973 A1* | 5/2016 | Lee .................... | H04W 36/165 370/311 |

OTHER PUBLICATIONS

International Search Report and the Written Opinion of the international Searching Authority corresponding to International Patent Application No. PCT/SE2015/050715 (17 pages) (dated Nov. 10, 2015).
3GPP TS 36.423 V12.3.0 (Sep. 2014) 3$^{rd}$ Generation Partnership Project; Technical Specification Group Radio Access Network; Evolved Universal Terrestrial Radio Access Network (E-UTRAN); X2 application protocol (X2AP)(Release 12), 650 Route des Lucioles, Sophia Antipolis, Valbonne, France; 153 pp.
Ericsson, "Discussion on NAICS assistance information signalling", Agenda Item: 16; Document for Discussions & Approval; 3GPP TSG-RAN3 Meeting #85bis, R385b.24a, Shanghai, China, Oct. 6-10, 2014, 6 pp.
Ericsson, Change Request—"X2 support for Network Assisted Interference Cancellation and Suppression", Source to TSG: R3; Work item code: LTE_NAICS-Core, Date: Aug. 25, 2014; for 3GPP TSG-RAN3 Meeting #85bis, R385b.24b, Shanghai, China, Oct. 6-10, 2014, 18 pp.
Liao, "LS for Rel-12 NAICS", 3GPP TSG-RAN WG1 Meeting #78, R1-143535, Dresden, Germany, Aug. 18-22, 2014, 2 pp.
Mediateck Inc, "X2 Support for Network Assisted Interference Cancellation", 3GPP TSG-RAN WG3 Meeting #85, R3-141964, Dresden, Germany, Aug. 18-22, 2014, 20 pp.
Nokia Networks, Change Request—"X2 support for Network Assisted Interference Cancellation", Source to TSG: R3; Work item code: LTE_NAICS-Core, Date: Nov. 4, 2014; for 3GPP TSG-RAN WG3 Meeting #86, R3-142892, San Francisco, USA, Nov. 17-21, 2014, 68 pages.
Chinese Office Action, CN 201580052124.7, dated Jan. 29, 2018, 7 pages.
Decision to Grant dated May 7, 2018, JP 2017-512732, 3 pages.
"X2 Support for Network Assisted Interference Cancellation" (Mediatek Inc.) 3GPP TSG RAN WG3 Meeting #85, Agenda Item 18.4, Dresden, Germany, Aug. 18-22, 2014, R3-141851, 3 pages.
"Implementation of the NAICS signaling in X2AP" (Nokia Networks) 3GPP TSG-RAN WG3 Meeting #85bis, Agenda Item 16, Shanghai, P. R. China, Oct. 6-10, 2014, R3-142370, 2 pages.
"Discussion on NAICS assistance information signalling" (Ericsson) 3GPP TSG-RAN3 Meeting #85bis, Agenda Item 16, Shanghai, China, Oct. 6-10, 2014, R3-142438, 6 pages.

\* cited by examiner

Figure 3

| IE/Group Name | Presence | Range | IE type and reference | Semantics description |
|---|---|---|---|---|
| Over the Air Signalling Indication | O | | ENUMERATED (recommended, not recommended, ....) | Indication of whether the information should be signalled over the air or not |

Figure 4

| IE/Group Name | Presence | Range | IE type and reference | Semantics description |
|---|---|---|---|---|
| NAIC Information Benefit Metric | O | | INTEGER( 0..100, ....) | It indicates the benefit, as seen by the sending node, of signalling NAIC information to victim UEs. Value "0" indicates no benefit, value "100" indicates maximum benefit. |

Figure 5

| IE/Group Name | Presence | Range | IE type and reference | Semantics description |
|---|---|---|---|---|
| NAIC Information Benefit Metric | O | | ENUMERATED (low, medium, high,...) | It indicates the benefit, as seen by the sending node, of signalling NAIC information to victim UEs. Value "low" indicates low benefit, value "medium" indicates medium benefit. Value "high" indicates maximum benefit. |

SIGNALING FOR INTERFERENCE REDUCTION

CROSS REFERENCE TO RELATED APPLICATIONS

This application is a 35 U.S.C. § 371 national stage application of PCT International Application No. PCT/SE2015/050715, filed on 18 Jun. 2015, which itself claims priority to U.S. provisional Application No. 62/055,815, filed 26 Sep. 2014, the disclosure and content of both of which are incorporated by reference herein in their entirety. The disclosures of all of the above referenced applications are hereby incorporated herein in their entireties by reference.

BACKGROUND

Embodiments disclosed herein relate to wireless communications, and more particularly to signaling for interference reduction.

3GPP ($3^{rd}$ Generation Partnership Project) LTE (Long Term Evolution) represents a project within the third generation partnership project, with an aim to improve the UMTS (Universal Mobile Telecommunications System) E-UTRA (Evolved Universal Terrestrial Radio Access) standard. The 3GPP LTE radio interface may provide relatively high peak data rates, relatively low delays, and/or an increase in spectral efficiencies. The LTE ecosystem supports both Frequency division duplex (FDD) and Time division duplex (TOD) to enable network operators to exploit both the paired and unpaired spectrum since LTE has flexibility in bandwidth by supporting 6 bandwidths 1.4 MHz, 3 MHz, 5 MHz, 10 MHz, 15 MHz, and 20 MHz.

The LTE physical layer is designed to achieve higher data rates, and is facilitated by turbo coding/decoding, and higher order modulations (up to 64-QAM). The modulation and coding is adaptive, and depends on channel conditions. Orthogonal frequency division multiple access (OFDMA) is used for the downlink, while Single carrier frequency division multiple access (SC-FDMA) is used for the uplink. Such schemes may provide an advantage that the channel response is relatively flat over a sub-carrier even though the multi-path environment could be frequency selective over the entire bandwidth. This may reduce complexity involved in equalization, as simple single tap frequency domain equalizers can be used at the receiver. OFDMA may allow LTE to achieve relatively higher data rates, reduced latency, and/or improved capacity/coverage, with reduced cost to the network operator.

An LTE/LTE-A system may use frequency reuse equal to one, meaning that the neighbor cells use the same resources (in time and frequency). Performance of UEs in one cell may be impacted due to the transmission of data/reference/control channels in a neighbor cell. One method to improve performance of UEs subject to interference from a neighbor cell may include using Network Assisted Interference Cancellation (NAIC) signaling. For these reasons, a work item on NAIC is being developed in 3GPP for LTE.

The terms interference mitigation receiver, interference cancellation receiver, interference suppression receiver, interference rejection receiver, interference aware receiver, interference avoidance receiver, or any combination thereof are interchangeably used, and they all belong to a category of advanced/enhanced receivers. Interference cancellation or suppression by such advanced receiver structures can lead to the elimination/reduction of the interference, in which case the interference may be completely cancelled and/or substantially reduced, whereas in other cases, the impact of interference on the useful signal may be reduced. Examples of signals or channels whose interference may be mitigated include PDSCH, PDCCH, PCFICH, PBCH, etc.

FIG. 1 is a message sequence chart of a proposed NAIC signaling scheme currently being studied in 3GPP. The aggressor node (also referred to as an aggressor base station) is the node causing interference to UEs receiving signals from the victim node (also referred to as a victim base station), e.g., a serving node, neighboring node etc. For example, the UE receiving signals (e.g. perform measurements, etc.) from one neighboring node may receive interference from another neighboring node or even from the serving node. This node may be referred to as the victim node, and the UEs which are connected to this node (the victim node) may be referred to as victim UEs. The aggressor node may also be interchangeably referred to as an interfering node, an interfering source, and/or an interfering cell. As shown in FIG. 1, the aggressor node may send the assistance information (described later) to the victim node via any opportune and/or available interface, for example, using the X2 interface or other high speed link. The victim node then sends the assistance information to the victim UE through higher layer (e.g. RRC or Radio Resource Control) signaling. Once the victim UE receives this information, the victim UE can estimate the neighbor cell (aggressor cell) channels (pilot, control, data, etc.) and remove the interference from the received signal.

Currently, there are discussions in 3GPP regarding a type of assistance information (also referred to as assisting information, assistance data, NAIC information, etc.) the aggressor node should send to the victim node and what information should be signaled to the UE by the serving node. The assistance information may include cell ID and/or CRS-IC info, Power offsets, "used Transmission Modes (TM) in eNodeB", and/or "Resource allocation and precoding granularity," etc. The assistance information may also include MBSFN (Multicast-Broadcast Single Frequency Network) subframe configuration in aggressor node, resource blocks used, modulation and coding scheme, etc. CRS-IC information, for example, is information that can assist in canceling CRS interference from neighbor cells.

According to existing NAIC methodologies and assuming that signaling of NAIC information is transmitted from aggressor node (also referred to as an interferer or interfering node) to victim node, the aggressor node may need to convey the assistance information to the victim node so that the victim node may use this information to configure the victim UEs via higher layer signaling. The victim UEs may use this information to cancel and/or mitigate interference from the aggressor node and/or aggressor UEs (i.e., UEs served by the aggressor node and/or generating interference). However, this may require that a potentially substantial and/or frequent amount of information is sent from the aggressor node to the victim node. Transmission of this information may limit a capacity of the inter node signaling interface (e.g. over X2 interface), and/or transmission performance degradation may occur due to unexpected conditions on the interface backhaul, such as increase of delay and/or jitter. Once the information is received, the victim node may need to send higher layer signaling to one or more victim UEs (e.g., via RRC), which may require additional resources (e.g., time, frequency, power, etc.). If such signaling is frequent and/or large in size, it could limit air interface resources available for the traffic channels for its own cell.

SUMMARY

According to some embodiments of inventive concepts, a method may be provided at a first network node supporting inter-node interference reduction. The method may include communicating an interference reduction report activation message between the first network node and a second network node. After communicating the interference reduction report activation message, an interference reduction assistance information message may be communicated between the first and second network nodes. After communicating the interference reduction assistance information message, an interference reduction report deactivation message may be communicated between the first and second network nodes.

Communicating the interference reduction report activation message may include transmitting the interference reduction report activation message from the first network node to the second network node, communicating the interference reduction assistance information message may include receiving the interference reduction assistance information message at the first network node from the second network node, and communicating the interference reduction report deactivation message may include transmitting the interference reduction report deactivation message from the first network node to the second network node. In addition, at least an element of the interference reduction assistance information message may be transmitted from the first network node to a user equipment node served by the first network node.

The interference reduction assistance information message may include information based on downlink transmissions from the second network node, and transmitting the interference reduction report activation message may include transmitting the interference reduction report activation message responsive to an evaluation of a benefit of initiating interference reduction.

The evaluation, for example, may be based on at least one of a number of interference reduction capable UEs served by the first network node that are active, interference experienced by a UE served by the first network Node, a location of a UE served by the first network node, a geometry of a UE served by the first network node, measurement of an uplink transmission received from a UE served by the first network node, channel quality information received from a UE served by the first network node, and/or a neighbor cell measurement received from a UE served by the first network node.

Transmitting the interference reduction report deactivation message may include transmitting the interference reduction report deactivation message responsive to an evaluation of a benefit of continuing interference reduction. The evaluation, for example, may be based on at least one of a number of interference reduction capable UEs served by the first network node that are active, interference experienced by a UE served by the first network Node, a location of a UE served by the first network node, a geometry of a UE served by the first network node, measurement of an uplink transmission received from a UE served by the first network node, channel quality information received from a UE served by the first network node, and/or a neighbor cell measurement received from a UE served by the first network node.

Communicating the interference reduction report activation message may include receiving the interference reduction report activation message at the first network node from the second network node, communicating the interference reduction assistance information message may include transmitting the interference reduction assistance information from the first network node to the second network node, and communicating the interference reduction report deactivation message may include receiving the interference reduction report deactivation message at the first network node from the second network node. The interference reduction assistance information message may include information based on downlink transmissions from the first network node.

Communicating the interference reduction report activation message may include transmitting the interference reduction report activation message from the first network node to the second network node, communicating the interference reduction assistance information message may include transmitting the interference reduction assistance information from the first network node to the second network node, and communicating the interference reduction report deactivation message may include transmitting the interference reduction report deactivation message from the first network node to the second network node.

Communicating the interference reduction report activation message may include receiving the interference reduction report activation message at the first network node from the second network node, communicating the interference reduction assistance information message may include receiving the interference reduction assistance information at the first network node from the second network node, and communicating the interference reduction report deactivation message may include receiving the interference reduction report deactivation message at the first network node from the second network node. In addition, at least an element of the interference reduction assistance information message may be transmitted from the first network node to a user equipment node served by the first network node.

The interference reduction assistance information message may include a Network Assisted Interference Cancellation, NAIC, assistance information message.

The interference reduction assistance information message may include at least one of a cell identification, cell specific reference signal interference cancelation information, power offset information, used Transmission Modes in eNodeB information, resource allocation and precoding granularity information, MBSFN subframe configuration information, resource blocks used, and/or modulation/coding scheme information.

Each of the interference reduction report activation message, the interference reduction assistance information message, and the interference reduction report deactivation message may be communicated over an X2 interface between the first and second network nodes.

Each of the interference reduction report activation message, the interference reduction assistance information message, and the interference reduction report deactivation message may be communicated as an element of a Load Information message.

In addition, an over the air signaling recommendation for the interference reduction assistance information message may be communicated between the first and second network nodes.

According to some other embodiments of inventive concepts, a method may be provided at a first network node supporting inter-node interference reduction. The method may include communicating an interference reduction assistance information message between the first network node and a second network node, and communicating an over the air signaling recommendation for the interference reduction assistance information message between the first and second network nodes.

The interference reduction assistance information message may be a first interference reduction assistance information message, and the over the air signaling recommendation may be a first over the air signaling recommendation. After communicating the first interference reduction assistance information message, a second interference reduction assistance information message may be communicated between the first and second network nodes. After communicating the first over the air signaling recommendation, a second over the air signaling recommendation for the second interference reduction assistance information message may be communicated between the first and second network nodes, wherein the first and second over the air signaling recommendations are different.

Communicating the first and second interference reduction assistance information messages may include transmitting the first and second interference reduction assistance information messages from the first network node to the second network node, and communicating the first and second over the air signaling recommendations may include transmitting the first and second over the air signaling recommendation from first node to the second node.

The first over the air signaling recommendation may be determined based on an evaluation of interference reduction using the first interference reduction assistance information message, and wherein the second over the air signaling recommendation is determined based on an evaluation of interference reduction using the second interference reduction assistance information message.

Each of the evaluations of interference reduction may be based on at least one of an estimation of interference generated by the first network node toward UEs of the second network node, a modulation order of a downlink transmission from the first network node, a data rate of a downlink transmission from the first network node, a likelihood of UEs of the second network node decoding downlink transmission from the first network node, and/or a downlink transmission power of the first network node.

Communicating the first and second interference reduction assistance information messages may include receiving the first and second interference reduction assistance information messages at the first network node from the second network node, and communicating the first and second over the air signaling recommendations may include receiving the first and second over the air signaling recommendations at the first node from the second node.

The interference reduction assistance information message may include at least one of a cell identification, cell specific reference signal interference cancelation information, power offset information, used Transmission Modes in eNodeB information, resource allocation and precoding granularity information, MBSFN subframe configuration information, resource blocks used, and/or modulation/coding scheme information.

The interference reduction assistance information message and the over the air signaling recommendation may be communicated over an X2 interface between the first and second network nodes. Moreover, the interference reduction assistance information message and the over the air signaling recommendation may be communicated as elements of a Load Information message.

According to still other embodiments of inventive concepts, a first network node may be provided for use in a radio access network (RAN). More particularly, the first network node may be adapted to: communicate an interference reduction report activation message between the first network node and a second network node; communicate an interference reduction assistance information message between the first and second network nodes after communicating the interference reduction report activation message; and communicate an interference reduction report deactivation message between the first and second network nodes after communicating the interference reduction assistance information message.

According to yet other embodiments of inventive concepts, a first network node may be provided for use in a radio access network (RAN). More particularly, the first network node may be adapted to: communicate an interference reduction assistance information message between the first network node and a second network node, and communicate an over the air signaling recommendation for the interference reduction assistance information message between the first and second network nodes.

According to more embodiments of inventive concepts, a first network node of a radio access network (RAN) may include a network interface configured to provide communications between the first network node and other network nodes, a transceiver configured to provide wireless communications between the first network node and user equipment nodes (UEs) served by the first network node, and a processor coupled to the network interface and the transceiver. Communications with another network node may be provided through the network interface, and communications with user equipment nodes (UEs) served by the network node may be provided through the transceiver. More particularly, the processor may be configured to: communicate an interference reduction report activation message through the network interface between the first network node and a second network node; communicate an interference reduction assistance information message through the network interface between the first and second network nodes after communicating the interference reduction report activation message; and communicate an interference reduction report deactivation message through the network interface between the first and second network nodes after communicating the interference reduction assistance information message.

According to more embodiments of inventive concepts, a first network node of a radio access network (RAN) may include a network interface configured to provide communications between the first network node and other network nodes, a transceiver configured to provide wireless communications between the first network node and user equipment nodes (UEs) served by the first network node, and a processor coupled to the network interface and the transceiver. Communications with another network node may be provided through the network interface, and communications with user equipment nodes (UEs) served by the network node may be provided through the transceiver. More particularly, the processor may be configured to: communicate an interference reduction assistance information message through the network interface between the first network node and a second network node; and communicate an over the air signaling recommendation for the interference reduction assistance information message through the network interface between the first and second network nodes.

Using activation/deactivation messages according to some embodiments of inventive concepts, unnecessary transmission of interference reduction assistance information may be reduced thereby reducing consumption of backhaul and/or air interface resources. In addition, interference may be reduced due to reduction of air interface signaling between the network and the victim wireless terminal. Moreover, base station and/or wireless terminal processing may be reduced by reducing unnecessary communication of interference reduction assistance information.

Using over the air signaling recommendations according to some embodiments of inventive concepts, an aggressor node can signal whether interference reduction assistance information should be signalled by a victim node over the air to a victim UE(s) served by the victim node. Such over the air signalling recommendations may enable a victim node (eNB base station) to appropriately select interference reduction assistance information from multiple neighbouring nodes (eNB base stations) that should be signalled to the victim UEs. The aggressor node (eNB base station) may be the node that is in the best position to determine whether its served UEs may cause interference to a neighbour cell, since the agressor node may know the exact channel configuration of its served UEs as well as a strength of reception of neighbour cell signals by its UEs (which provides information about proximity of the UEs to a neighbour cell). Accordingly, a recommendation (from the aggressor node) of whether to adopt the interference reduction assistance information for signalling by the victim node to the victim UEs may assist the victim node in filtering out information that does not provide considerable/sufficient gains in interference reduction and leaving the information that accounts for most of the interference suffered. Moreover, by reducing information that is signalled to a victim UE, processing and/or time resources dedicated by the victim UE to interference cancellation/reduction may be reduced.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a table illustrating an information element IE encoding for an over the air signaling recommendation by an aggressor node according to some embodiments of inventive concepts;

FIG. 4 is a table illustrating a weight factor information element IE encoding for an over the air signaling recommendation by an aggressor node according to some embodiments of inventive concepts;

FIG. 5 is a table illustrating a weight factor IE encoding for an over the air signaling recommendation by an aggressor node according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN that communicates over radio communication channels with wireless terminals (also referred to as UEs). It will be understood, however, that inventive concepts are not limited to such embodiments and may be embodied generally in any type of communication network. As used herein, a legacy or non-legacy wireless terminal (also referred to as a UE, user equipment node, mobile terminal, etc.) can include any device that receives data from and/or transmits data to a communication network, and may include, but is not limited to, a mobile telephone ("cellular" telephone), laptop/portable computer, pocket computer, hand-held computer, and/or desktop computer.

Note that although terminology from 3GPP (3rd Generation Partnership Project) LTE (Long Term Evolution) has been used in this disclosure to provide examples embodiments of inventive concepts, this should not be seen as limiting the scope of inventive concepts to only the aforementioned system. Other wireless systems, including WCDMA, WiMax, UMB and GSM, may also benefit from exploiting ideas/concepts covered within this disclosure.

Also, note that terminology such as eNodeB (also referred to as a base station, eNB, etc.) and UE (also referred to as a wireless terminal, mobile terminal, etc.) should be considering non-limiting and does not imply a certain hierarchical relation between the two. In general, "eNodeB" could be considered as a first device and "UE" could be considered as a second device, and these two devices may communicate with each other over some radio channel. Similarly, when talking about signaling over an X2 backhaul, inventive concepts are not limited to communication between eNBs. but the communicating nodes can be any nodes terminating the backhaul interface over which the information described is transmitted.

Figure 8:
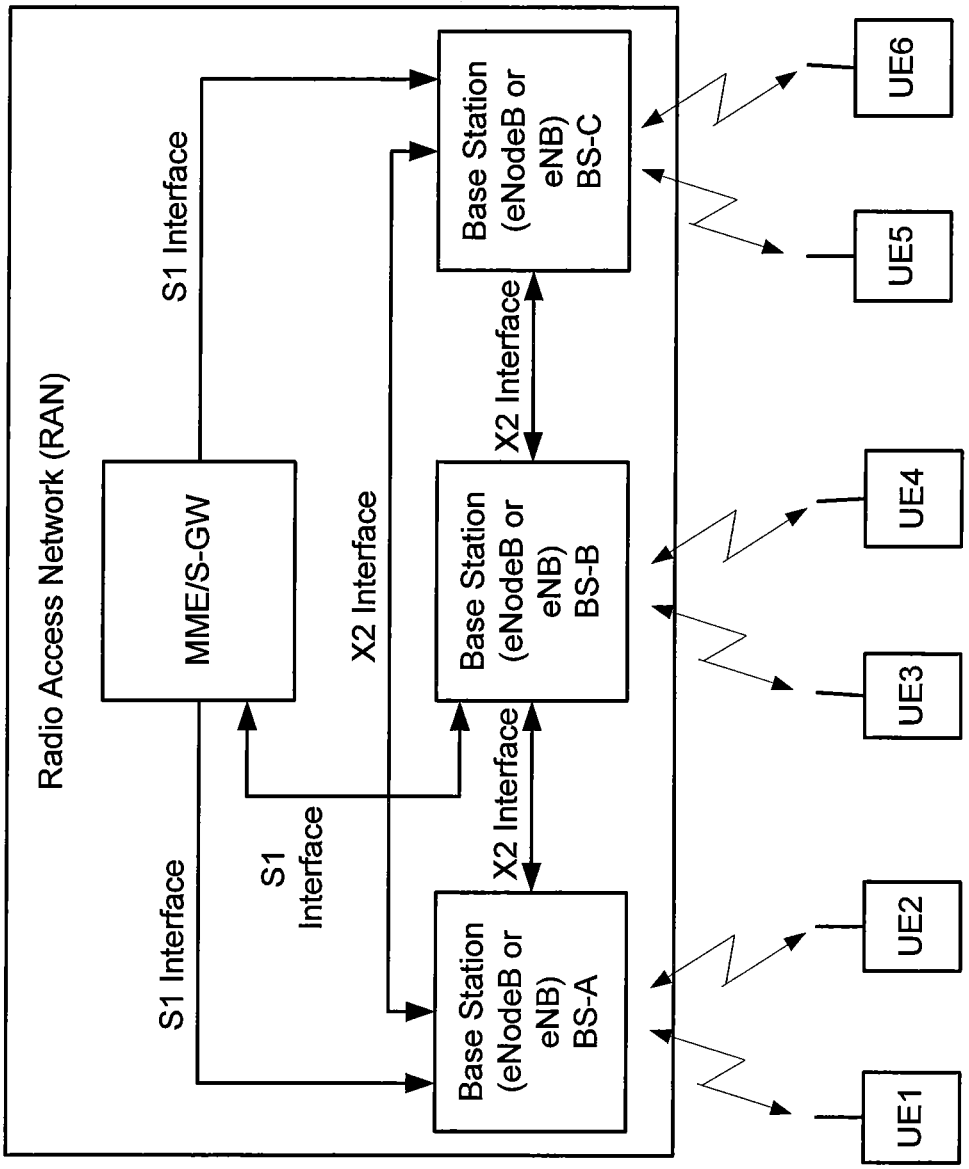
FIG. 8 is a block diagram illustrating a radio access network according to some embodiments of inventive concepts according to some embodiments of inventive concepts.

FIG. 8 is a block diagram illustrating a Radio Access Network (RAN) according to some embodiments of present inventive concepts. As shown, communications between a plurality of base stations BS-A, BS-B, and BS-C may be provided using respective X2 Interfaces, and communications between base stations and one or more core nodes MME/S-GW may be provided using respective S1 interfaces. Each base station BS may communicate over a radio interface (including uplinks and downlinks) with respective wireless terminals UEs in a respective cell or cells supported by the base station. By way of example, base station BS-A is shown in communication with wireless terminals UE-1 and UE-2, base station BS-B is shown in communication with wireless terminals UE-3 and UE-4, and base station BS-C is shown in communication with wireless terminals UE-5 and UE-6.

For purposes of the following discussion, base station BS-A may be an aggressor node serving aggressor UEs (wireless terminals) UE1 and UE2, and base station BS-B may be a victim node BS-B serving victim UEs (wireless terminals) UE3 and UE4. According to some embodiments, base station BS-A may be a macro node (also referred to as a high power node), and base station BS-B may be a pico node (also referred to as a low power node) operating in a coverage area (cell) of base station BS-A. According to some other embodiments, base stations BS-A and BS-B may be neighboring macro nodes. Moreover, base station BS-C may be a second aggressor node relative to victim base station BS-B.

Figure 9:
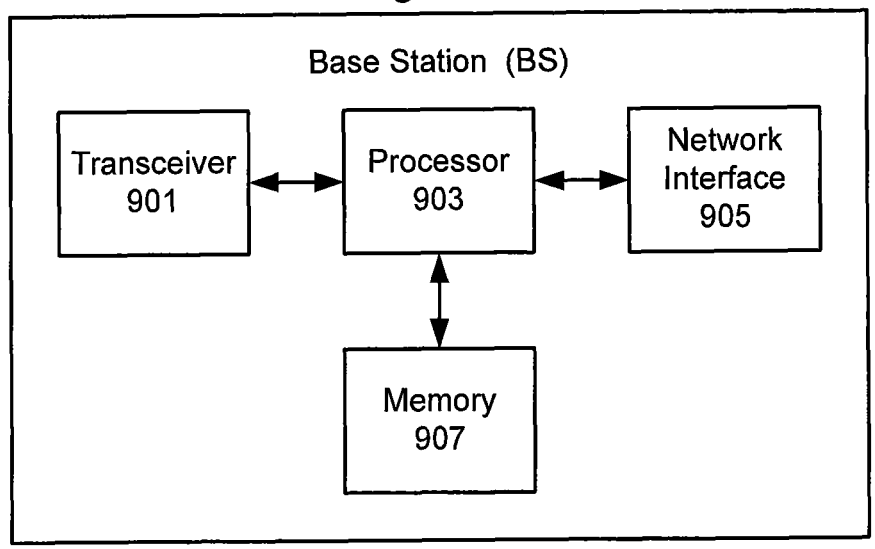
FIG. 9 is a block diagram illustrating a base station of FIG. 8 according to some embodiments of inventive concepts.

FIG. 9 is a block diagram illustrating elements of a base station BS of FIG. 8. As shown, a base station BS may include a transceiver circuit 901 (also referred to as a transceiver) configured to provide radio communications with a plurality of wireless terminals, a network interface circuit 905 (also referred to as a network interface) configured to provide communications with other base stations of the RAN (e.g., over the X2 interface), and a processor circuit 903 (also referred to as a processor) coupled to the transceiver circuit and the network interface circuit, and a memory circuit 907 coupled to the processor circuit. The memory circuit 907 may include computer readable program code that when executed by the processor circuit 903 causes the processor circuit to perform operations according to embodiments disclosed herein. According to other embodiments, processor circuit 903 may be defined to include memory so that a memory circuit is not separately provided.

Figure 10:
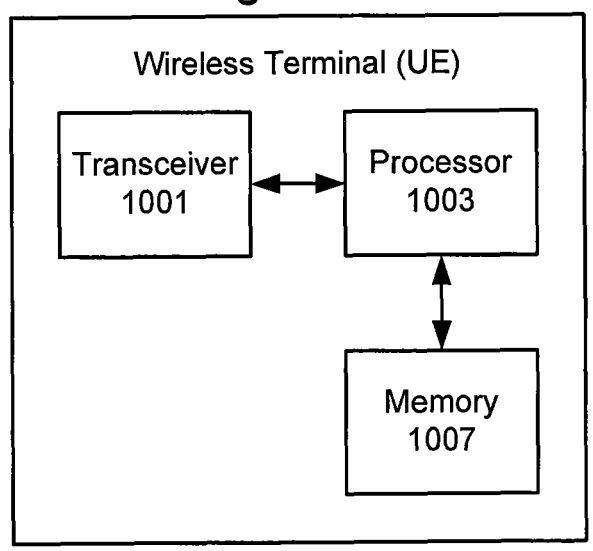
FIG. 10 is a block diagram illustrating a wireless terminal of FIG. 8 according to some embodiments of inventive concepts.

FIG. 10 is a block diagram illustrating elements of a wireless terminal UE of FIG. 8. As shown, a wireless terminal UE may include a transceiver circuit 1001 (also referred to as a transceiver) configured to provide radio communications with a base station BS, a processor circuit 1003 (also referred to as a processor) coupled to the transceiver circuit, and a memory circuit 1007 coupled to the processor circuit. The memory circuit 1007 may include computer readable program code that when executed by the processor circuit 1003 causes the processor circuit to perform operations according to embodiments disclosed herein. According to other embodiments, processor circuit 1003 may be defined to include memory so that a memory circuit is not separately provided.

As discussed above, NAIC signaling between network nodes (also referred to as base stations) could limit resources available for other communications between network nodes (base stations) and/or available for communications between network nodes and respective UEs (also referred to as wireless or mobile terminals). These issues may be more relevant when the NAIC information communicated between aggressor and victim nodes is not useful to alleviate problems of interference management. For example, considering the dynamically changing distribution of UEs within cells, UEs within an aggressor cell may generate limited interference with respect to UEs of a victim cell to which data should be scheduled. In this case, inter node NAIC signaling may be unnecessary if the scheduled UEs are not experiencing significant interference that needs to be cancelled, and use of NAIC information may result in unnecessary use of signaling resources over the inter node interface and/or over the air interface.

There may be other cases where stopping the inter node procedure for NAIC information signaling may itself incur in extra signaling. Further, if such start/stop conditions for inter node signaling are relatively frequent, complexity may increase considerably. Discarding and/or filtering NAIC information for/at the receiving victim node BS-B may thus be desired, and discarding and/or filtering may be desired in a manner so that significant air interface resources are not used to transfer the NAIC information to UEs served by the victim node BS-B. Moreover, discarding and/or filtering may depend on how relevant the NAIC information is with respect to mitigating interference from aggressor node BS-A and aggressor UEs.

According to some embodiments disclosed herein, techniques are proposed to reduce NAIC signaling overhead, depending on the interference conditions of victim UEs (e.g., UE3 and UE4) and hence the usefulness of the NAIC information. In situations where a victim UE is not expected to experience a sufficient benefit using the NAIC assistance information to mitigate interference, for example, transmission of the NAIC assistance information may be blocked to reduce signaling overhead. In these situations, transmission of NAIC signaling information to victim UEs (e.g., wireless terminals UE3 and UE4) may be blocked to reduce over the air signaling, and/or transmission of NAIC signaling information between aggressor and victim nodes (e.g., base stations BS-A and BS-B) may be blocked to reduce inter node signaling. Accordingly, NAIC signaling from the aggressor node BS-A may be switched off when the aggressor node BS-A senses that assistance information may not sufficiently benefit the victim UEs.

In other embodiments, additional information may be provided within signaling from the aggressor node (e.g., base station BS-A) to the victim node (e.g., base station BS-B), wherein the additional information enables the victim node BS-B to avoid/reduce sending and/or to filter out NAIC assistance information to the victim UE, in the event that NAIC assistance information is unlikely to provide sufficient benefit to the victim UE for interference mitigation from the aggressor node (also referred to as the aggressor cell). This may enable the victim node BS-B to reduce/avoid signaling certain NAIC information to UEs over the air, thereby saving air interface resources.

Some embodiments disclosed herein may include methods in a aggressor node (e.g., base station BS-A) causing interference to a victim UE and in a serving node (also referred to as a victim node) BS-B serving the victim UE. Such methods may be provided by an aggressor node (also referred to as an interfering node) that may cause interference to a victim UE receiving a signal from a victim node BS-B. For example, a method by the aggressor node BS-A may include:

Identifying, based on one or more criteria (e.g., geometry of UEs in communication with the aggressor node BS-A), whether or not NAIC assistance information for use by the victim node BS-B is relevant or useful, or identifying a degree of usefulness of the NAIC assistance information; and Deciding based on the identification whether or not to transmit the NAIC assistance information to the victim node BS-B and/or transmitting to the victim node BS-B information about the degree of usefulness of the NAIC assistance information for the victim UE.

According to some embodiments, a method in a serving node (also referred to as a serving node of victim UE, a victim node BS-B, a victim base station, etc.) BS-B serving a victim UE may include:

Identifying based on one or more criteria (e.g., location of victim UE, signaling overheads, load, etc.) whether or not an aggressor node BS-A, which may cause interference to the victim UE (e.g., UE3) while receiving signals from a victim node BS-B (e.g., serving or neighboring node), should send the NAIC assistance information related to the victim UE to the serving node BS-B; and Sending, based on the identification, a request to the aggressor node BS-A whether or not the aggressor node BS-A should send assistance information to the serving/victim node BS-B.

According to some additional embodiments, a method in a serving node (also referred to as a serving node of a victim UE) serving a victim UE may include:

Receiving an indication from an aggressor node BS-A whether or not the serving node BS-B should transmit the NAIC assistance information to the victim UE and/or receiving information about a degree of usefulness of the NAIC assistance information for use by the victim UE; and Deciding, based on the received indication, whether or not to send NAIC assistance information to the victim UE.

According to some embodiments, transmission of unnecessary network assistance messages may be reduced/avoided, thereby saving backhaul (e.g., X2 interface) and/or air interface resources. In addition, interference may be reduced due to reduction in radio interface signaling overhead at the victim node BS-B. Stated in other words, interference may be reduced by reducing transmission of NAIC assistance information from a victim base station BS-B to victim UEs UE3 and UE4. Moreover, processing at the network nodes and/or UEs may be reduced due to avoidance/reduction of unnecessary signaling.

The following terminologies are used in embodiments of the present disclosure, and these terminologies are described below.

Radio network node: In some embodiments the non-limiting term radio network node may be used, and the term radio network node refers to any type of network node serving a UE(s) and/or connected to another network node or network element or any radio node from where a UE receives signaling. Examples of radio network nodes include: NodeBs, base stations (ES), multi-standard radio (MSR) radio nodes such as MSR ES, eNode Bs, network controllers, radio network controllers (RNC), base station controllers, relays, donor node controlling relays, base transceiver stations (BTS), access point (AP), transmission points, transmission nodes, RRU (Remote Radio Units), RRH (Remote Radio Heads), nodes in distributed antenna systems (DAS), etc. The radio network node may also be called a radio node or simply a node, for example, an aggressor node BS-A, victim node BS-B, serving node, neighboring node, etc.

Network node: In some embodiments a more general term "network node" is used and it can correspond to any type of radio network node or any network node, which communicates with at least a radio network node. Examples of a network node include any radio network node stated above, a core network node (e.g. MSC, MME etc.), O&M node, OSS node, SON node, positioning node (e.g. E-SMLC), MDT node, etc.

User equipment or User equipment node (UE): In some embodiments the non-limiting term user equipment (UE) is used, and UE refers to any type of wireless device communicating with a radio network node in a cellular or mobile communication system. Examples of UEs include target device, device to device UE, machine type UE, or a UE capable of machine to machine communication, a PDA (Personal Digital Assistant), an iPad, a Tablet computer, a mobile terminal, a smart phone, laptop embedded equipment (LEE), laptop mounted equipment (LME), USB dongles, etc.

Embodiments of present inventive concepts may include one or more of the following: methods at an aggressor node BS-A to switch off NAIC assistance information; methods at an aggressor node BS-A to provide NAIC assistance information to allow signaling optimization/improvement at a victim node BS-B; and/or methods at a victim node BS-B to reduce higher layer signaling to UEs (e.g., to UE3 and UE4) served by the victim node BS-B.

According to some embodiments, a first UE (e.g., victim UE3) is served by at least a first node (e.g., victim node BS-B) of a first cell. The first UE (UE3) may receive a signal from the first node (e.g., BS-B), and the first UE (UE3) may also receive interference from a second node (e.g., aggressor node BS-A). The second node (BS-A) may also serve at least a second UE (e.g., UE1) in a second cell. The first UE (e.g., UE3), the first node (e.g., BS-B), and the second node (e.g., BS-A) may also be interchangeably referred to as the victim UE, the victim node BS-B, and the aggressor or interfering node, respectively.

In some embodiments, the first UE (UE3) may receive interference from two or more interfering nodes (e.g., from the second node BS-A and a third node BS-C) while receiving signals from the first node (e.g., from BS-B).

In some embodiments, the first UE (UE3) may receive interference from one or more interfering nodes (e.g., BS-A and BS-C) while receiving signals from both a serving node BS-B and from a non-serving node (e.g., from a fourth node), for example, during soft handover.

Network assistance interference cancellation may be most effective if the victim UE (e.g., UE3) is able to decode the interfering data packet from the aggressor node BS-A (which is scheduled to another UE in a cell served by the aggressor node BS-A). If the victim UE (e.g., UE3) cannot decode the interfering data packet, gain due to interference cancellation may usually be reduced, or in some cases even negligible, compared to gains when the victim UE can decode the interfering data packet. In these cases, the NAIC assistance information and the higher layer signaling may not be needed, because there may be no/reduced system gain at the system level and/or at the link level. In these cases, transmission of NAIC assistance information may be switched off according to some embodiments to reduce unnecessary signaling overhead.

In addition, signaling overload may be reduced by reducing transmission of NAIC information when such information is unlikely to provide a significant/sufficient benefit.

In some embodiments, mechanisms may be provided to stop and/or filter out signaling messages and/or to reduce/avoid transmission of NAIC information.

According to some embodiments, aggressor node BS-A may stop sending assistance information (either autonomously on its own, or based on a recommendation/request from victim node BS-B). Note that in some embodiments, aggressor node BS-A can completely switch off (i.e., stops transmitting) NAIC assistance information to victim node BS-B, while in another embodiment, aggressor node BS-A can send minimal/reduced information (e.g., a flag) to indicate to the other node (e.g., victim node BS-B) that it is not sending assistance information.

Aggressor node BS-A may use one or plurality of criteria to determine and/or decide whether to send or to stop sending the NAIC assistance information to victim node BS-B. Examples of such criteria are described as follows.

According to some embodiments, aggressor node BS-A does not transmit the NAIC assisting information if a geometry (or equivalent measurement such as signal strength) of the UEs connected to (communicating with) aggressor node BS-A and which are in active mode (i.e., in the RRC connected state) is greater than GTh (Geometry Threshold), where GTh is a pre-configured threshold (e.g. RSRP is −85 dBm or more). If the aggressor node BS-A is serving a high geometry UE(s) (i.e., UEs that are relatively close to aggressor node BS-A), then a victim UE (e.g., UE3 or UE4 of FIG. 8), which is at or beyond the cell edge (served by victim node BS-B), usually cannot decode the interfering data packet intended for the UE of aggressor node/cell BS-A.

Figure 1:
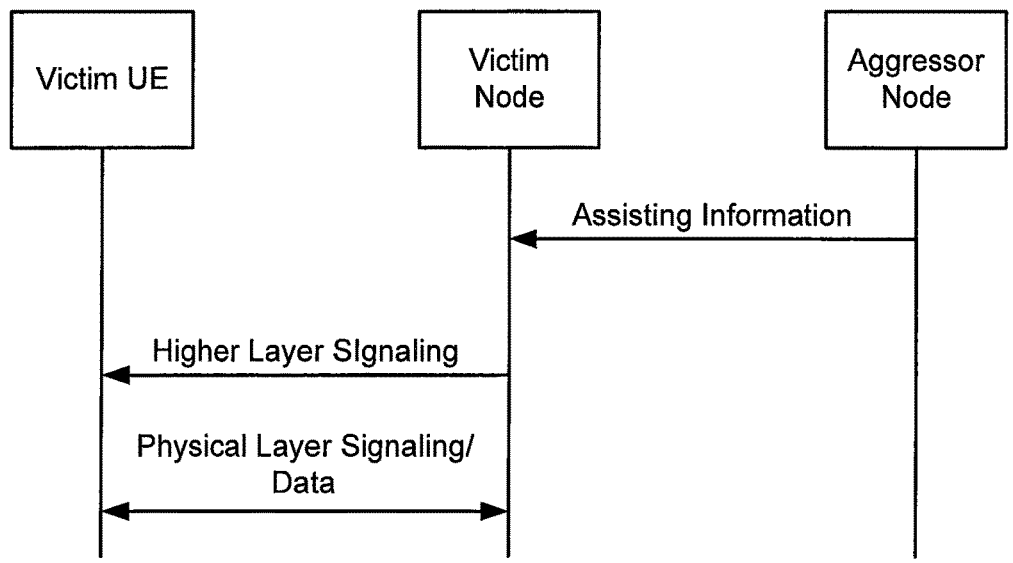
FIG. 1 is a message sequence chart illustrating operations of network assistance interference cancellation.
Figure 2:
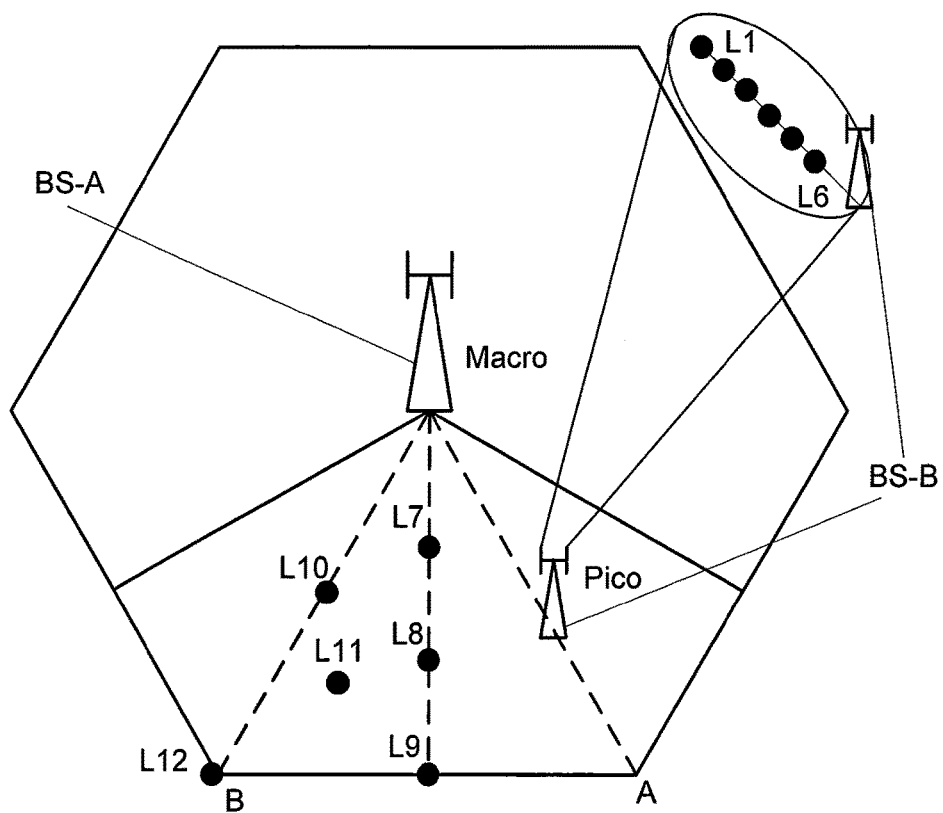
FIG. 2 is a schematic diagram illustrating wireless terminal geometries in a network including macro and pico base stations.

An example is illustrated in FIG. 2 where aggressor node BS-A is a macro node, and victim node BS-B is a pico node operated in a coverage area of aggressor node BS-A. In FIG. 2, aggressor node BS-A (shown as macro node) is serving UEs (aggressor UEs) at locations L7 to L12, and victim node BS-B (shown as a Low Power Node or LPN) is serving UEs (victim UEs) at location L1 to L6. If it is assumed that the UEs at locations L7 and L10 are in active mode and the remaining UEs are in idle mode, and if it is assumed that GTh is such that only UEs at locations L7 and L10 are considered as high geometry UEs, then, according to some embodiments, aggressor node BS-A can switch off transmitting NAIC assistance information because when aggressor node BS-A serves UEs at locations L7 and L10, victim UEs (e.g., at locations L1-L6) may not able to decode the data packets transmitted to UEs at locations L7 and L10.

Assuming that UEs at locations L7 and L10 have relatively high geometries exceeding the geometry threshold GTh and that UEs at locations L8, L9, L11, and L12 have relatively low geometries less than the geometry threshold, aggressor base station BS-A may switch off transmitting NAIC assistance information responsive to none of the low geometry UEs at locations L8, L9, L11, and/or L12 is active. Responsive to one of the low geometry UEs being active, however, aggressor node BS-A may switch on transmitting NAIC assistance information.

Note that different techniques may be used to compute geometries of UEs in the macro cell of aggressor node BS-A. UE geometries may be computed, for example. Based on CQI (channel quality information) reported by UEs communicating with aggressor base station BS-A, and/or based on uplink measurements based on transmissions received from UEs at aggressor base station BS-A.

In LTE/LTE-A, each UE reports periodic or aperiodic CQI based on reference signal measurements. According to some embodiments, the eNode B can identify a geometry of a UE by averaging CQI reports from the UE over time.

According to some embodiments, aggressor node BS-A may determine a geometry of a UE based on received signal strength from uplink measurements (i.e., measurements of uplink transmissions received at aggressor node ES-A from a UE), for example, UE traffic/control channels.

According to other embodiments, aggressor node BS-A may be an Active Antenna System (AAS) base station that is able to perform beamforming. When scheduling the UE at location L10, the aggressor node BS-A may be able to send data to the UE at location L10 via a user specific beam that does not create significant interference towards victim UEs at locations L1-L6 served by the victim node BS-B. Since there is little or no interference towards victim UEs when L10 is served from aggressor node BS-A, NAIC assisting information may be of little or no use during such occasions.

In general, it may be up to aggressor node BS-A to deduce when and how serving UEs would not generate significant interference with respect to victim node BS-B. Upon this decision, aggressor node BS-A may be allowed to stop reporting NAIC assistance information to victim node BS-B.

According to some embodiments, aggressor node BS-A may also take into account the transmit power of one or more signals (e.g., PDSCH, etc.) transmitted by the aggressor node BS-A to its own UEs (e.g., UE1 and UE2) in order to decide whether or not to send the NAIC assistance information to victim node BS-B. For example, responsive to the transmit power of one or more channels being below a threshold over certain time period (e.g., over a frame), then aggressor node BS-A may stop transmitting NAIC assistance information to victim node BS-B. This is because at relatively low transmit power levels, victim UEs (e.g., UE3 and UE4) will receive reduced and/or negligible interference from aggressor node BS-A (i.e. second node).

According to some embodiments, aggressor node BS-A may also take into account locations of its own UEs (e.g. second UE such UE1 and UE2) in order to decide whether or not to send NAIC assistance information to victim node BS-B. UE locations may be determined or obtained by aggressor node BS-A based on existing positioning methods (e.g., based on Global Navigation Satellite System SGNSS, enhanced cell ID, fingerprinting, etc.)

For example, if the second UE served by aggressor node BS-A is located close to aggressor node BS-B, then aggressor node BS-A may stop transmitting the NAIC assistance information to victim node BS-B. Because the second UE is relatively close to aggressor node BS-A, the second UE (UE1 or UE2) may be served with relatively low transmit power. As a result, the first UE (i.e., victim UE, UE3 or UE4) may receive less or negligible interference from the aggressor node BS-A (i.e. second node).

According to some embodiments, aggressor node BS-A may obtain information related to the geometry and/or location of the first UE (e.g., victim UE3 or UE4) with respect to aggressor node BS-A and/or with respect to victim node BS-B. For example, victim node BS-B may determine or obtain a path loss and/or RSRP measurement performed by victim UE3 and/or UE4 on signals of victim node BS-B. Victim node BS-B may also forward this information (e.g., RSRP and/or even location of the victim UE) to aggressor node BS-A. Aggressor node BS-A may then also take into account this information about the victim UE(s) in order to decide whether or not to send the NAIC assistance information to victim node BS-B.

For example, based on the obtained geometry and/or location victim UE(s), responsive to determining that the victim UE is located close to victim node BS-B and/or far from aggressor node 13S-A, then aggressor node BS-A may stop transmitting the NAIC assistance information to victim node BS-B. Because the victim UE is relatively close to victim node BS-B and/or relatively far from aggressor node BS-A, the victim UE will receive less or negligible interference from aggressor node BS-A.

According to some embodiments, aggressor node BS-A evaluates the radio conditions of UEs (e.g., UE1 and UE2) served by aggressor node BS-A and deduces an amount of interference that could be generated towards victim node BS-B by aggressor node BS-A, or a likelihood of victim UEs (e.g., UE3 and UE4) being able to decode PDUs (Protocol Data Units) transmitted by victim node BS-B to the served UEs (e.g., UE3 and UE4) in the presence of interference from aggressor node BS-A. For example, responsive to a level of aggressor node BS-A interference being below a given threshold, responsive to interference from aggressor node BS-A being estimated to be negligible/insignificant, and/or responsive to a modulation order or data rate of aggressor node transmissions being above a threshold, aggressor node BS-A may indicate in a signaling message to victim node BS-B not to take the NAIC assistance information into account. Therefore, aggressor node BS-A can recommend to victim node BS-B via an explicit indication to avoid over the air signaling of such NAIC assistance information from victim node BS-B to victim UEs.

An example of how such an indication may be signaled from aggressor node BS-A to victim node BS-B is illustrated in FIG. 3. As shown in FIG. 3, aggressor node BS-A can transmit an over the air signaling indication to victim node BS-B either recommending transmission of NAIC assistance information from victim node BS-B to victim UEs UE3 and UE4, or not recommending transmission of NAIC assistance information from victim node BS-B to victim UEs UE3 and UE4.

The above information of FIG. 3 may be provided, for example, via the X2 interface as part of a dedicated message or as part of the LOAD INFORMATION message in LTE. In general the information of FIG. 3 may be provided in the same message conveying NAIC assistance information. The recommendation of FIG. 3 may provide a relatively low (binary) level of granularity, with values of either recommended or not recommended. Accordingly, a single bit/flag may be used to communicate the recommendation.

In other embodiments, aggressor node BS-A may provide an indication of a benefit victim UEs may gain if configured by the victim node BS-B with the NAIC assistance information sent by aggressor node BS-A. Such an indication may not necessarily be restricted to a benefit, but it may in general provide a weight factor associated with how important it may be for victim node BS-B to signal the NAIC assistance information over the air to victim UEs.

FIG. 4 provides an example of how such an indication may be signaled from aggressor node BS-A to victim node BS-B. As shown in the example of FIG. 4, the weight (referred to as a NAIC information benefit metric) may be assigned a value from zero to 100, providing a relatively high level of granularity.

According to still other embodiments, an indication of a benefit to victim UEs may be signaled as illustrated in FIG. 5. As shown in FIG. 5, the indication of benefit may be assigned one of three values: low benefit, medium benefit, or high benefit. Embodiments of FIG. 5 thus provide an intermediate level of granularity, between the relatively low and high levels of granularity provided by embodiments of FIGS. 3 and 4.

Any one or more of the recommendations of FIGS. 3, 4, and/or 5 may be provided from aggressor node BS-A to victim node BS-B, for example, via the X2 interface as part of a dedicated message or as part of the LOAD INFORMATION message. In general, the recommendations of FIGS. 3, 4, and/or 5 may be provided in a same message conveying NAIC assistance information.

According to some embodiments, once victim node BS-B receives a recommendation/indication from aggressor node BS-A to discard/disregard the signaled NAIC information, victim node BS-B may perform the following operations:

Evaluate whether victim node BS-B received NAIC assistance information from any other aggressor node BS-C and whether there was any such information recommended to signal over the air by the sending aggressor node BS-C;

Evaluate over the air signaling conditions such as load;

Decide whether to signal the NAIC assistance information received to the victim UEs on the basis of the experienced over the air signaling conditions and/or on the basis of whether any of the information received was recommended or not recommended to be signaled to victim UEs;

Responsive to deciding to signal NAIC assistance information over the air and responsive to more than one aggressor node BS-A and BS-C recommending to signal over the air the NAIC assistance information, deciding what information should be signaled, i.e., relative to which aggressor node BS-A or BS-C, based on an estimation of a strongest interfering node/cell; and Responsive to none of the aggressor nodes recommending to signal over the air the NAIC assistance information, deciding whether to signal any of the information received by evaluating over the air signaling load and possible benefits in signaling such information.

According to some embodiments, once victim node BS-B receives from aggressor node BS-A an indication representing a weight factor for the signaled NAIC assistance information, victim node BS-B may perform the following operations:

Evaluate whether to signal the NAIC assistance information to victim UEs or avoid signaling over the air based on the indicated weight factor; and In case NAIC assistance information is received from multiple aggressor nodes BS-A and BS-C, evaluate which information to signal to victim UEs based on respective weight factors indicated by each aggressor node BS-A and BS-C.

According to some embodiments, the node serving the victim UE can recommend to the aggressor node BS-A not to send NAIC assistance information. This can occur in many cases.

The victim node BS-B can determine whether it should recommend the aggressor node BS-A to send the NAIC assistance information to the victim node BS-B or not based on one or more of the following factors/criteria:

A Number of victim UEs using assistance information;

Geometry and/or location of victim UEs;

Recommendation from victim UEs; and/or

Reduction of signaling overhead(s).

According to some embodiments, responsive to victim node BS-B identifying that a negligible number (including none at all) victim UEs which are connected and/or which are in active mode are capable of using NAIC assistance information.

According to some embodiments, responsive to a geometry of the victim UEs with respect to the victim node BS-B (e.g., path loss, RSRP, etc., with respect to the victim node BS-B) and which are NAIC capable being greater than some pre-determine threshold, then the victim node BS-B can recommend to the aggressor node BS-A to not send the NAIC assistance information. Because of the high geometry of victim UEs with respect to the victim node BS-B and/or because the victim UEs are located close to the victim node BS-B, the victim UEs are not likely to be significantly impacted by interference from aggressor node BS-A. Such victim UEs are close to the cell center of the victim node BS-B and NAIC assistance information may not be sufficiently useful for the victim UEs to mitigate interference from aggressor node BS-A to justify the additional overhead of signaling NAIC assistance information.

According to some embodiments, each NAIC capable victim UEs may explicitly recommend to victim node BS-B whether it needs NAIC assistance information or not. The information from a UE may be common for all or separate for each serving node and/or neighboring node from which the victim node BS-B is receiving or intends to receive signals. Victim node BS-B then takes into account this recommendation from the victim UE in order to stop or allow aggressor node(s) BS-A/BS-C to send NAIC assistance information to victim node BS-B. For example, a victim UE can determine based on downlink measurements on aggressor node BS-A a received signal (e.g. RSRP, RSRQ etc) from aggressor node BS-A. If the received signal strength is below a threshold, then victim UE may recommend to victim node BS-B (e.g. serving node) that victim UE does not need any assistance information. Based on recommendations received from NAIC capable UEs served by victim node BS-B, victim mode BS-B can decide whether to send a recommendation to aggressor node BS-A to send NAIC assistance information to victim node BS-B or to send a recommendation to aggressor node BS-A to not send NAIC assistance information to victim node BS-B.

Victim node BS-B may not have sufficient radio resources to transmit NAIC assistance information to all victim UEs, for example, when cell load in terms of number of UEs and/or downlink data rate per UE is higher than a respective threshold(s).

In this case, victim node BS-B may recommend to aggressor node(s) BS-A that for certain victim UEs (e.g. those close to victim node BS-B) the aggressor node BS-A stops transmitting the NAIC assistance information. The victim node BS-B may also send such indication to selected aggressor nodes, for example, to aggressor nodes which causes less interference or that cause interference to fewer victim UEs.

Victim node BS-B may have limited resources to receive and/or process NAIC assistance information from the aggressor node BS-A over inter-node interface (e.g., over X2 between victim and aggressor eNBs). For example, victim node BS-B may have a capability to receive and/or process NAIC assistance information only for N number of victim UEs (e.g. N=30) from one aggressor node BS-A. This could be due to limited hardware resources (e.g., memory, processor units, etc.) and/or limited transport network channels on the interface.

In this case, the victim node BS-B may recommend the aggressor node(s) BS-A/BS-C that for certain victim UEs (e.g., those close to victim node BS-B), aggressor node BS-A stops transmitting NAIC assistance information to the victim node BS-B. The victim node BS-B may also recommend a maximum number of victim UEs for which the victim node BS-B can receive NAIC assistance information. In this case, aggressor node BS-A may itself decide for which victim UE it should send NAIC assistance information to victim node BS-B.

As discussed above according to some embodiments, victim node BS-B may need to send NAIC assistance information (which it received from aggressor node BS-A) via over the air signaling (e.g. using the Radio Resource Control RRC protocol). However, if victim node BS-B receives information from aggressor node BS-A that there is no assistance information or if victim node BS-B did not receive any NAIC assistance information, victim node BS-B will not send any assistance information to victim UEs. In some embodiments, victim node BS-B can indicate to the UEs to not use NAIC because there is no/insignificant interference from the neighbor cell. For example, NAIC capable victim UEs may be configured with NAIC information from aggressor node BS-A previously received from victim node BS-B, and responsive to receiving the indication to not use NAIC, the NAIC capable victim UEs may skip NAIC (interference cancellation/reduction) operations until instructed otherwise.

In other embodiments, victim node BS-B may take into account a recommendation regarding NAIC assistance information received from aggressor node BS-A (e.g., the information element IE of FIGS. 3-5) in order to decide whether to send NAIC assistance information to victim UEs or not. For example, in order to reduce signaling overhead and if a value of 'NAIC Information Benefit Metric' indicates not recommended, low, or below 50%, then victim node BS-B may avoid sending NAIC assistance information to the victim UE.

In yet other embodiments, if victim node BS-B periodically and/or on a triggered basis checks geometry of a victim UE(s), and if the geometry (e.g., RSRP, path loss, etc., with respect to victim node BS-B) of the victim UE is greater than a pre-determined threshold, then victim node BS-A can indicate to the victim UE not to use NAIC assistance, and/or to ignore previously sent NAIC parameters.

In yet other embodiments, victim node BS-B may compare a victim UE's first geometry (e.g., PL1, RSRP1, etc.) of the victim UE with respect to victim node BS-B as well as the victim UE's second geometry (e.g., PL2, RSRP2 etc) with respect to at least one aggressor node BS-A with their respective thresholds. In this case, responsive to the first geometry being above a threshold and the second geometry being below a threshold, only then the victim node BS-B may not send NAIC assistance information to the victim UE and/or explicitly indicate that the victim UE not use NAICS and/or ignore previously sent NAICS related parameters for interference mitigation/cancellation.

The victim UE may receive interference from more than one aggressor node BS-A and BS-C when receiving signals from victim node BS-B (e.g. from serving node or neighboring node). Therefore, victim node BS-B may further take into account the recommendation regarding NAIC assistance information received from two or more aggressor nodes (e.g., received via an information element IE of FIGS. 3-5) in order to decide whether to send NAIC assistance information to the victim UEs or not, or to indicate to a victim UE whether or not to use NAICS.

In some embodiments, aggressor node BS-A or victim node BS-B can generate an indication to stop NAIC information reporting over an interface between the nodes (e.g., from aggressor node BS-A to victim node BS-B). Such indication may, for example, be provided over the inter-node interface (e.g., X2 interface) connecting the two nodes (e.g., two eNBs). One possible way to provide such information may be via the X2 interface, as part of a dedicated message or as part of the LOAD INFORMATION message. In general, the information above may be provided in a same message conveying NAIC information.

Figure 6:
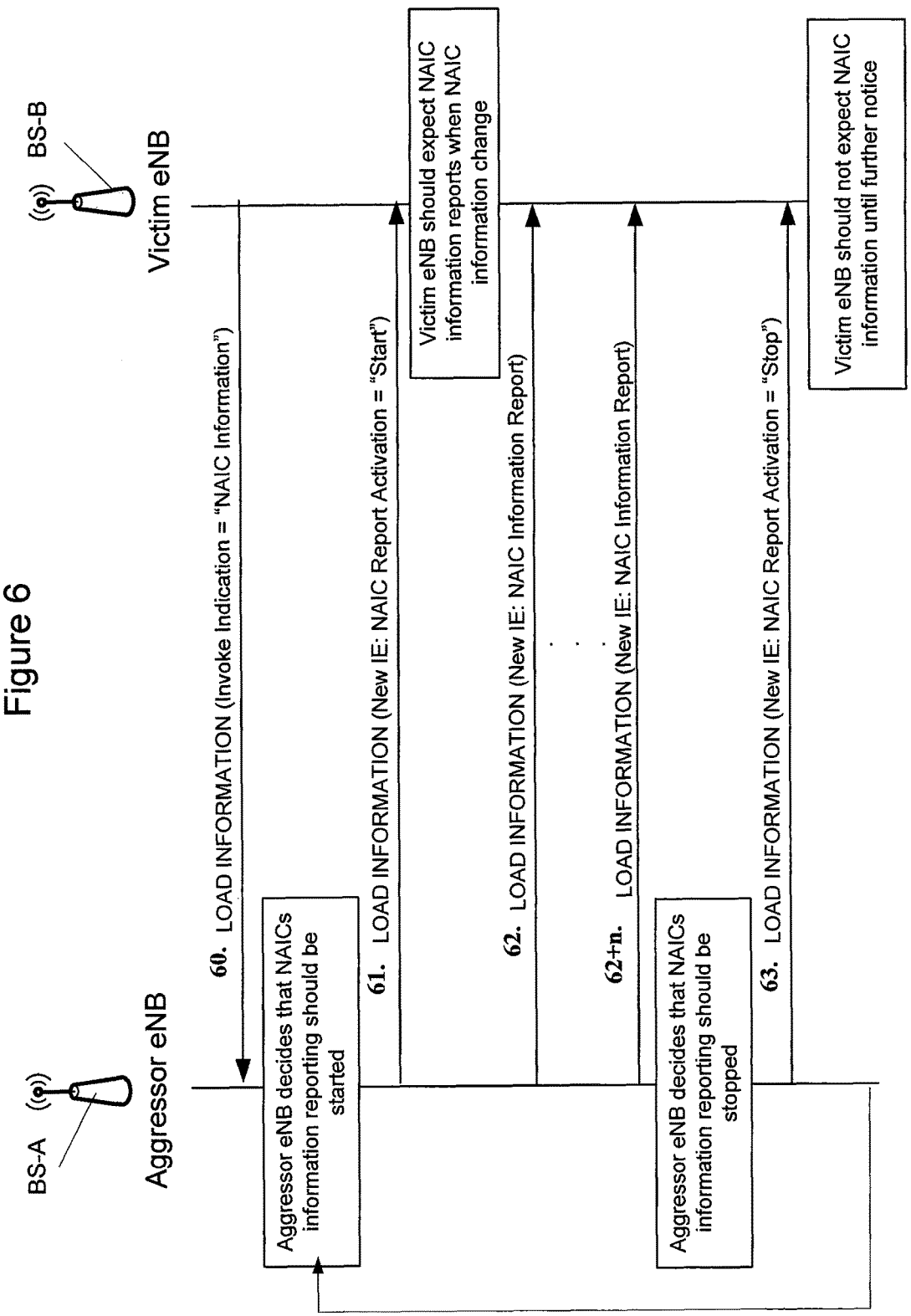
FIG. 6 is a message sequence chart illustrating network assistance interference cancellation start/stop triggered by an aggressor node according to some embodiments of inventive concepts.

FIG. 6 illustrates an example of how such information may be exchanged between aggressor and victim nodes (e.g., between two eNBs).

In FIG. 6, NAIC report start/stop is triggered by Aggressor node 13S-A. At operation 60 of FIG. 6, a first indication to start NAIC procedures may be sent by victim node (eNB) ES-B using the Invoke Indication information element IE, included in the X2: LOAD INFORMATION message, set to a new value, for example equal to "NAIC Information".

Upon deciding that NAIC information is available and should be reported to victim node (eNB) BS-B, aggressor (eNB) node BS-A may send a LOAD INFORMATION message including an indication that NAIC information reporting is started at operation 61 of FIG. 6. Note that this message may already include NAIC information. At operations 62, . . . 62n of FIG. 6, NAIC information reports (including NAIC assistance information) may be transmitted by aggressor node BS-A and received by victim node BS-B.

If aggressor node BS-A realizes that NAIC reports are no longer needed, it may send a new indication (for example as part of the X2: LOAD INFORMATION message) where a new or existing IE may be set to a value indicating "NAIC Information Report Stop" at operation 63 of FIG. 6. Note that this indication may be conveyed together with a last NAIC Information report, and no further NAIC information reports may be transmitted until further activation notice (e.g., at operation 61 of FIG. 6). As indicated by the loop back to the top BS-A decision block, operations of starting NAIC information reporting, transmitting NAIC information reports, and stopping NAIC information reporting may be repeated.

According to some embodiments, such report start and stop decisions may be triggered by a number of events/factors evaluated by aggressor node BS-A, for example, including:
  evaluation that interference towards victim node BS-B has been overcome or has been reduced below a given threshold or in general is considerable enough/negligible enough;
  evaluation that the served UE geometry (for a UE served by aggressor node BS-A) is such as to generate or not to generate interference with respect to the victim node BS-B;
  evaluation that the served UE geometry (for a UE served by aggressor node BS-A) is such that data formats transmitted to the served UE will not likely be decodable by victim UEs; and/or
  evaluation that UE mobility is likely to generate or not to generate future interference towards the victim node BS-B.

Figure 7:
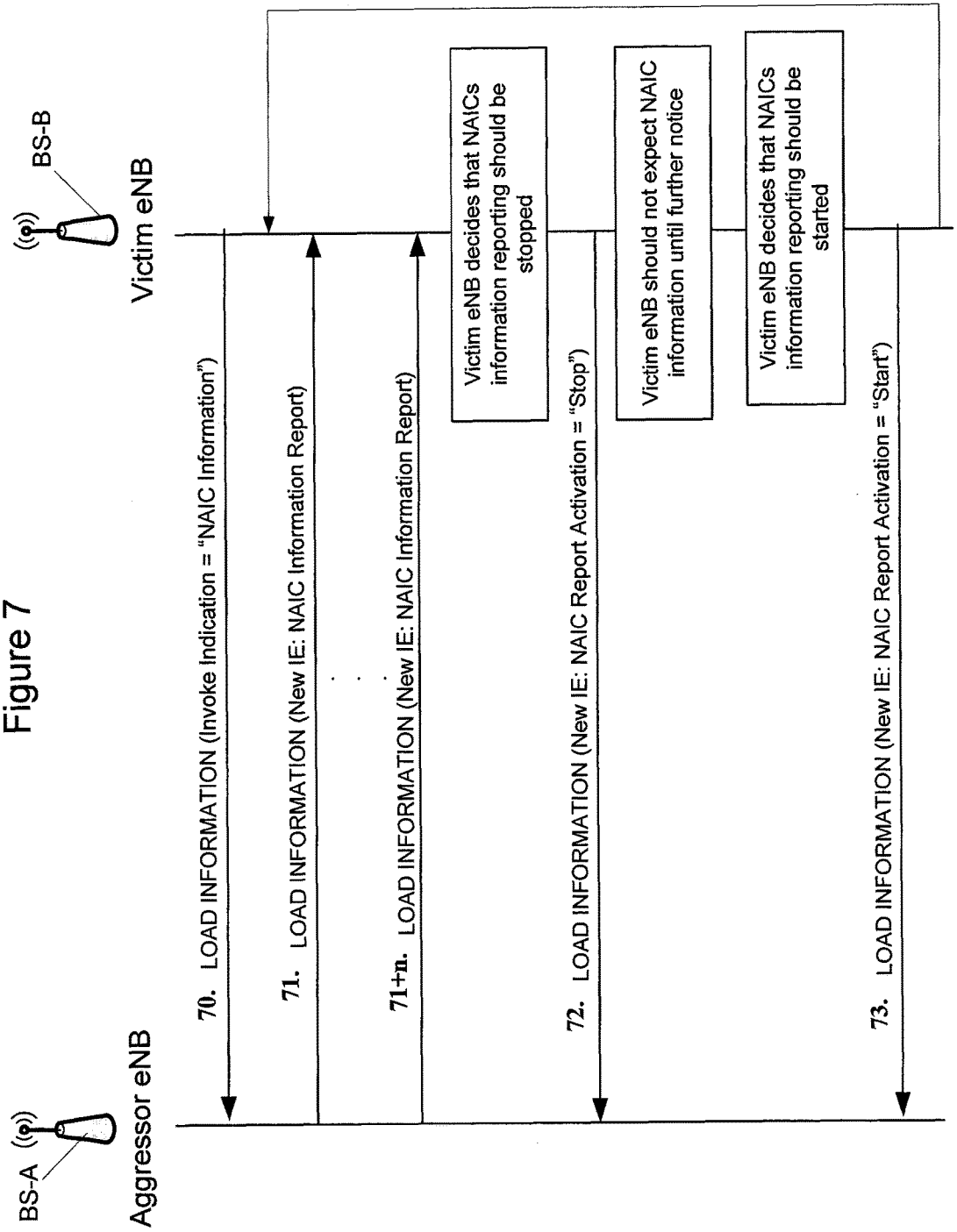
FIG. 7 is a message sequence chart illustrating network assistance interference cancellation start/stop triggered by a victim node according to some embodiments of inventive concepts.

In FIG. 7, another example of how NAIC report activation start/stop operations can be provided is presented. In FIG. 7, the start and stop messages are sent by the victim node BS-B. In the example of FIG. 7, the message descriptions are similar to those of FIG. 6 with a difference that victim node BS-B performs an evaluation of whether NAIC reports should be started or stopped and based on such evaluation, victim node BS-B signals aggressor node BS-A.

According to some embodiments, such report start and stop decisions may be triggered at victim node BS-B by a number of events evaluated by the victim eNB, for example, including:
  Evaluation that a sufficient number of NAIC capable UEs are present and active;
  Evaluation of interference experienced by victim UEs and whether such interference could be mitigated by receiving NAIC information from aggressor node BS-A and signaling such information to victim UEs;
  Evaluation of served/victim UE geometry(ies) and whether the geometry(ies) is sufficient to require/justify NAIC information reporting activation;
  Evaluation of neighbor cell measurements reported by served/victim UEs, providing an indication of which neighbor cells/nodes are likely to be the strongest interfering aggressor nodes.

In other embodiments aggressor node BS-A can provide a list of cells for which NAIC information should be reported by the aggressor node BS-A. Such a list can be included in a dedicated or existing message such as the X2: LOAD INFORMATION message, and the list may be provided together with the Invoke Indication IE set to "NAIC Information" or with the NAIC Information Activation Start/Stop indication. In the latter case, the list may represent the cells for which NAIC Information Reporting should be started or stopped.

According to some embodiments, a method may be provided at a first network node supporting inter-node interference reduction. The method may include communicating (e.g., FIG. 6, Operation 61; or FIG. 7, Operation 73) an interference reduction report activation message between the first network node and a second network node. After communicating the interference reduction report activation message, the method may include communicating (e.g., FIG. 6, Operation 62; or FIG. 7, Operation 71) an interference reduction assistance information message between the first and second network nodes. After communicating the interference reduction assistance information message, the method may include communicating (e.g., FIG. 6, Operation 63; or FIG. 7, Operation 72) an interference reduction report deactivation message between the first and second network nodes. In these embodiments, the first network node may be a victim node (e.g., BS-B) and the second node may be an aggressor node (e.g., BS-A), or the first network node may be an aggressor node (e.g., BS-A) and the second network node may be a victim node (e.g., BS-B). In addition, an over the air signaling recommendation for the interference reduction assistance information message may be communicated between the first and second network nodes.

The interference reduction assistance information message may be a Network Assisted Interference Cancellation (NAIC) assistance information message. The interference reduction assistance information message may include at least one of a cell identification, cell specific reference signal interference cancelation information, power offset information, used Transmission Modes in eNodeB information, resource allocation and precoding granularity information, MBSFN subframe configuration information, resource blocks used, and/or modulation/coding scheme information. Each of the interference reduction report activation message, the interference reduction assistance information message, and the interference reduction report deactivation message may be communicated over an X2 interface between the first and second network nodes. Each of the interference reduction report activation message, the interference reduction assistance information message, and the interference reduction report deactivation message may be communicated as an element of a Load Information message.

According to some embodiments illustrated for example in FIG. 7, a method may be provided at a first network node supporting inter-node interference reduction. The method may include transmitting (e.g., FIG. 7, Operation 73) an interference reduction report activation message from a first network node (e.g., BS-B) to a second network node (e.g., BS-A). After transmitting the interference reduction report activation message, the method may include transmitting (e.g., FIG. 7, Operation 73) an interference reduction assistance information message from the first network node (e.g., BS-B) to the second network node (e.g., BS-A). After transmitting the interference reduction assistance information message, the method may include transmitting (e.g., FIG. 7, Operation 72) an interference reduction report deactivation message from the first network node (e.g., BS-B) to the second network node (e.g., BS-A). The method may also include transmitting at least an element of the interference reduction assistance information message from the first network node (e.g., BS-B) to a user equipment node (e.g., UE3) served by the first network node (e.g., BS-B). The interference reduction assistance information message may include information based on downlink transmissions from the second network node (BS-A). According to these embodiments, the first network node may be a victim node and the second node may be an aggressor node, for example, according to embodiments illustrated in FIG. 7.

Transmitting the interference reduction report activation message may include transmitting the interference reduction report activation message responsive to an evaluation of a benefit of initiating interference reduction. The evaluation may be based on at least one of a number of interference reduction capable UEs served by the first network node (e.g., BS-B) that are active, interference experienced by a UE served by the first network Node (e.g., BS-B), a location of a UE served by the first network node, a geometry of a UE served by the first network node, measurement of an uplink transmission received from a UE served by the first network node, channel quality information received from a UE served by the first network node, and/or a neighbor cell measurement received from a UE served by the first network node.

Transmitting the interference reduction report deactivation message may include transmitting the interference reduction report deactivation message responsive to an evaluation of a benefit of continuing interference reduction. The evaluation may be based on at least one of a number of interference reduction capable UEs served by the first network node (e.g., BS-B) that are active, interference experienced by a UE served by the first network Node (e.g., BS-B), a location of a UE served by the first network node, a geometry of a UE served by the first network node, measurement of an uplink transmission received from a UE served by the first network node, channel quality information received from a UE served by the first network node, and/or a neighbor cell measurement received from a UE served by the first network node.

According to some embodiments illustrated for example in FIG. 7, a method may be provided at a first network node supporting inter-node interference reduction. The method may include receiving (e.g., FIG. 7, Operation 73) an interference reduction report activation message at the first network node (e.g., BS-A) from the second network node (e.g., BS-B). After receiving the interference reduction report activation message, the method may include transmitting (e.g., FIG. 7, Operation 71) an interference reduction assistance information message from the first network node (e.g., BS-A) to the second network node (e.g., BS-B). After transmitting the interference reduction assistance information message, the method may include receiving (e.g., FIG. 7, Operation 72) an interference reduction report deactivation message at the first network node (e.g., BS-A) from the second network node (e.g., BS-B). According to these embodiments, the first network node may be an aggressor node (e.g., BS-A) and the second node may be a victim node (e.g., BS-B), for example, according to embodiments illustrated in FIG. 7.

The interference reduction assistance information message may include information based on downlink transmissions from the first network node (e.g., BS-B).

According to some embodiments illustrated for example in FIG. 6, a method may be provided at a first network node supporting inter-node interference reduction. The method may include transmitting (e.g., FIG. 6, Operation 61) an interference reduction report activation message from the first network node (e.g., BS-A) to the second network node (e.g., BS-B). After transmitting the interference reduction report activation message, the method may include transmitting (e.g., FIG. 6, Operation 62) an interference reduction assistance information message from the first network node (e.g., BS-A) to the second network node (e.g., BS-B). After transmitting the interference reduction assistance information message, the method may include transmitting (e.g., FIG. 6, Operation 63) an interference reduction report deactivation message from the first network node (e.g., BS-A) to the second network node (e.g., ES-B). According to these embodiments, the first network node may be an aggressor node (e.g., BS-A) and the second node may be a victim node (e.g., BS-B), for example, according to embodiments illustrated in FIG. 6. The reduction assistance information message may include information based on downlink transmissions from the first network node (e.g., BS-A).

Transmitting the interference reduction report activation message may include transmitting the interference reduction report activation message responsive to an evaluation of a benefit of initiating interference reduction. The evaluation may be based on at least one of a level of interference generated by the first network node with respect to the second network node, a location of a UE served by the first network node, a geometry of a UE served by the first network node, a downlink transmission power of the first network node, a data format of a downlink transmission of the first network node, and/or expected mobility of a UE served by the first network node.

Transmitting the interference reduction report deactivation message may include transmitting the interference reduction report deactivation message responsive to an evaluation of a benefit of continuing interference reduction. The evaluation may be based on at least one of a level of interference generated by the first network node with respect to the second network node, a location of a UE served by the first network node, a geometry of a UE served by the first network node, a downlink transmission power of the first network node, a data format of a downlink transmission of the first network node, and/or expected mobility of a UE served by the first network node.

According to some embodiments illustrated for example in FIG. 6, a method may be provided at a first network node supporting inter-node interference reduction. The method may include receiving (e.g., FIG. 6, Operation 61) an interference reduction report activation message at the first network node (e.g., BS-B) from the second network node (e.g., BS-A). After receiving the interference reduction report activation message, the method may include receiving (e.g., FIG. 6, Operation 62) an interference reduction assistance information message at the first network node (e.g., BS-B) from the second network node (e.g., BS-A). After communicating the interference reduction assistance information message, the method may include receiving (e.g., FIG. 6, Operation 63) an interference reduction report deactivation message at the first network node (e.g., BS-B) from the second network node (e.g., BS-A). The method may also include transmitting at least an element of the interference reduction assistance information message from the first network node (e.g., BS-B) to a user equipment node (e.g., UE3) served by the first network node (e.g., BS-B). According to these embodiments, the first network node may be a victim node (e.g., BS-B) and the second node may be an aggressor node (e.g., BS-A), for example, according to embodiments illustrated in FIG. 6. Moreover, the reduction assistance information message may include information based on downlink transmissions from the first network node (e.g., BS-A).

According to some embodiments, a method may be provided at a first network node supporting inter-node interference reduction. The method may include communicating an interference reduction assistance information message between the first network node and a second network node. The method may also include communicating an over the air signaling recommendation for the interference reduction assistance information message between the first and second network nodes. According to these embodiments, the first network node may be a victim node (e.g., BS-B) and the second network node may be an aggressor node (e.g., BS-A), or the first network node may be an aggressor node (e.g., BS-A) and the second network node may be a victim node (e.g., BS-B).

The interference reduction assistance information message may be a first interference reduction assistance information message, and the over the air signaling recommendation may be a first over the air signaling recommendation. After communicating the first interference reduction assistance information message, the method may include communicating a second interference reduction assistance information message between the first and network nodes. After communicating the first over the air signaling recommendation, the method may include communicating a second over the air signaling recommendation for the second interference reduction assistance information message between the first and second network nodes wherein the first and second over the air signaling recommendations are different.

The over the air signaling recommendation may include a binary information element indicating a positive or negative recommendation as illustrated, for example, in FIG. 3. The over the air signaling recommendation may include a weight factor indicating one of at least 8 different recommendation values as illustrated, for example, by the recommendations values from 0 to 100 in FIG. 4. The over the air signaling recommendation may include an information element indicating at least one of three different recommendation values as illustrated, for example, by the low, medium, and high recommendation values of FIG. 5.

The interference reduction assistance information message may be a Network Assisted Interference Cancellation (NAIC) assistance information message. The interference reduction assistance information message may include at least one of a cell identification, cell specific reference signal interference cancelation information, power offset information, used Transmission Modes in eNodeB information, resource allocation and preceding granularity information, MBSFN subframe configuration information, resource blocks used, and/or modulation/coding scheme information.

The interference reduction assistance information message and the over the air signaling recommendation may be communicated over an X2 interface between the first and second network nodes. The interference reduction assistance information message and the over the air signaling recommendation may be communicated as elements of a Load Information message.

According to some embodiments, a method may be provided at a first network node supporting inter-node interference reduction. The method may include transmitting a first interference reduction assistance information message from the first network node (e.g., BS-A) to the second network node (e.g., BS-B). The method may also include transmitting a first over the air signaling recommendation for the interference reduction assistance information message from first node (e.g., BS-A) to the second node (e.g., BS-B). After communicating the first interference reduction assistance information message, the method may include transmitting a second interference reduction assistance information message from the first network node (e.g., BS-A) to the second network node (e.g., BS-B). After communicating the first over the air signaling recommendation, the method may include transmitting a second over the air signaling recommendation for the second interference reduction assistance information message from first node (e.g., BS-A) to the second node (e.g., BS-B) wherein the first and second over the air signaling recommendations are different. According to these embodiments, the first network node may be an aggressor node (e.g., BS-A) and the second network node may be a victim node (e.g., BS-B).

The first over the air signaling recommendation may be determined based on an evaluation of interference reduction using the first interference reduction assistance information message, and the second over the air signaling recommendation may be determined based on an evaluation of interference reduction using the second interference reduction assistance information message.

Each of the evaluations of interference reduction may be based on at least one of an estimation of interference generated by the first network node toward UEs of the second network node, a modulation order of a downlink transmission from the first network node, a data rate of a downlink transmission from the first network node, a likelihood of UEs of the second network node decoding downlink transmission from the first network node, and/or a downlink transmission power of the first network node.

According to some embodiments, a method may be provided at a first network node supporting inter-node interference reduction. The method may include receiving a first interference reduction assistance information message at the first network node (e.g., BS-B) from the second network node (e.g., BS-A). The method may also include receiving a first over the air signaling recommendation for the interference reduction assistance information message at first node (e.g., BS-B) from the second node (e.g., BS-A). After receiving the first interference reduction assistance information message, the method may include receiving a second interference reduction assistance information message at the first network node (e.g., BS-B) from the second network node (e.g., BS-A). After receiving the first over the air signaling recommendation, the method may include receiving a second over the air signaling recommendation for the second interference reduction assistance information message at first node (e.g., BS-B) from the second node (e.g., BS-A) wherein the first and second over the air signaling recommendations are different. According to these embodiments, the first network node may be a victim node (e.g., BS-B) and the second network node may be an aggressor node (e.g., BS-A).

Responsive to receiving the first over the air signaling recommendation, the method may include transmitting at least an element of the first interference reduction assistance information message from the first network node (e.g., BS-B) over a wireless interface to a user equipment node (e.g., UE3) served by the first network node (e.g., BS-B). Responsive to receiving the second over the air signaling recommendation, the method may include blocking transmitting any element of the second interference reduction assistance information message from the first network node (e.g., BS-B) over the wireless interface to the user equipment node (e.g., UE3) served by the first network node (e.g., BS-B).

Figure 11:
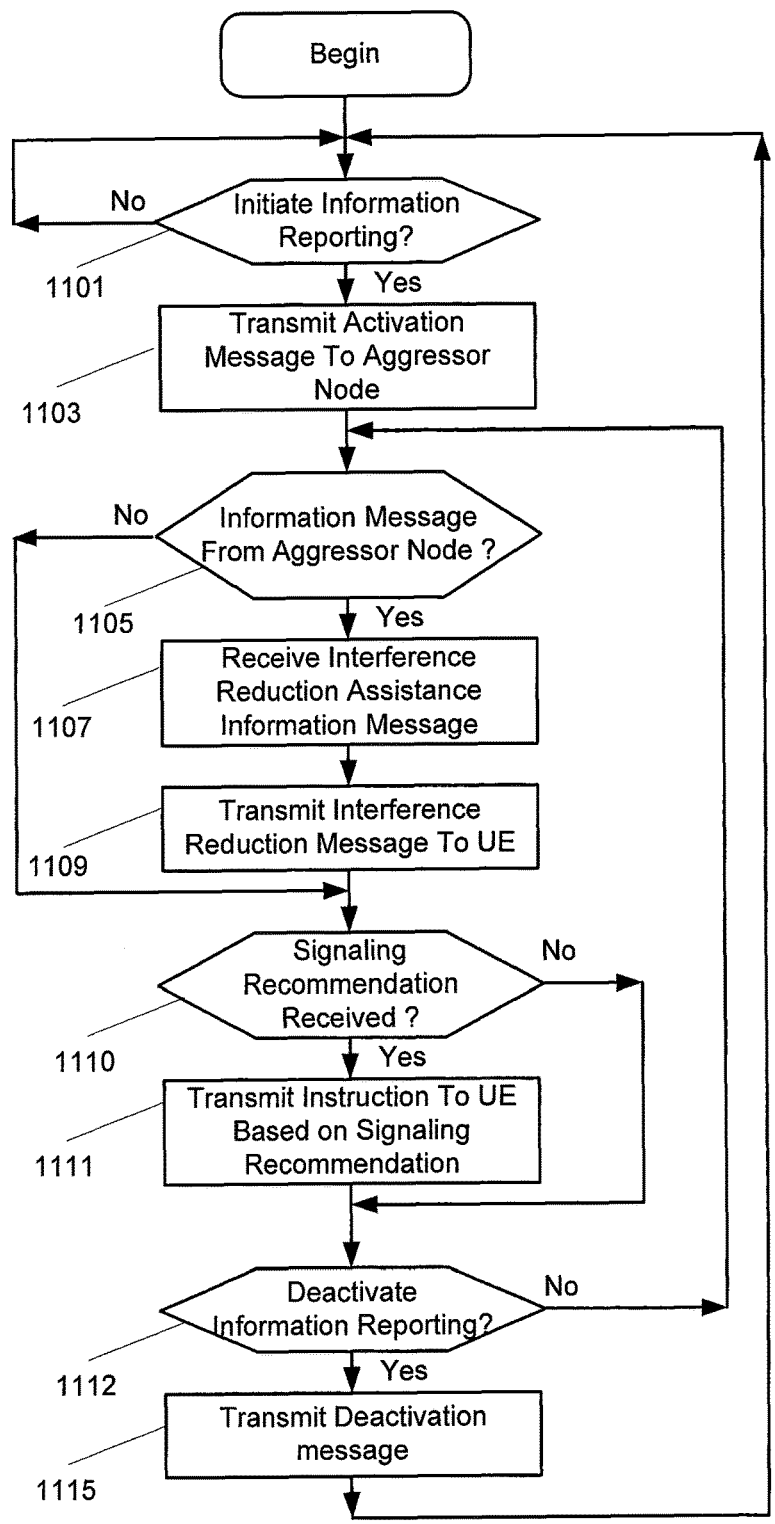
FIG. 11 is a flow chart illustrating victim node operations of FIG. 7 according to some embodiments of inventive concepts.

FIG. 11 is a flow chart illustrating victim node BS-B operations of FIG. 7 supporting inter-node interference reduction according to some embodiments of inventive concepts. Responsive to initiating information reporting at block 1101, processor 903 of victim node BS-B may transmit an interference reduction report activation message through network interface 905 to aggressor node BS-A at block 1103 (e.g., as an element of a Load Information message over an X2 interface). The interference reduction report activation message may be transmitted, for example, responsive to an evaluation of a benefit of initiating interference reduction. The evaluation may be based on at least one of a number of interference reduction capable UEs served by victim node BS-B that are active, interference experienced by a UE served by victim node BS-B, a location of a UE served by victim node BS-B, a geometry of a UE served by victim node BS-B, measurement of an uplink transmission received from a UE served by victim node BS-B, channel quality information received from a UE served by victim node BS-B, and/or a neighbor cell measurement received from a UE served by victim node BS-B.

After transmitting the interference reduction report activation message, processor 903 may receive an interference reduction assistance information message through network interface 905 from aggressor network node BS-A at blocks 1105 and 1107 (e.g., as an element of a Load Information message over an X2 interface). The interference reduction assistance information message may include information based on downlink transmissions from the aggressor network node BS-A. For example, the interference reduction assistance information message may include a network assisted interference cancellation (NAIC) assistance information message. Moreover, the interference reduction assistance information may include at least one of a cell identification, cell specific reference signal interference cancelation information, power offset information, used Transmission Modes in eNodeB information, resource allocation and precoding granularity information, MBSFN subframe configuration information, resource blocks used, and/or modulation/coding scheme information.

At block 1109, processor 903 may transmit at least an element of the interference reduction assistance information message through transceiver 901 to a user equipment node UE served by victim node BS-B.

If an over the air signaling recommendation for the interference reduction assistance information message is received through network interface 905 from aggressor node BS-A at block 1110, processor 903 may transmit an instruction through transceiver 901 to the UE based on the signaling recommendation at block 1111. For example, the signaling recommendation may be used to indicate that the interference reduction assistance information of block 1107 is no longer valid, and the instruction of block 1111 may be for the UE to discontinue interference reduction/cancellation until a next interference reduction message is provided.

At block 1112, processor 903 may loop through operations of blocks 1105, 1107, 1109, 1110, and/or 1111 until information reporting is to be deactivated at block 1112. Responsive to determining that information reporting should be deactivated at block 1112, processor 903 may transmit an interference reduction report deactivation message through transceiver 901 to aggressor network node BS-A at block 1115 (e.g., as an element of a Load Information message over an X2 interface). The interference reduction report deactivation message, for example, may be transmitted responsive to an evaluation of a benefit of continuing interference reduction. The evaluation may be based on at least one of a number of interference reduction capable UEs served by the first network node BS-B that are active, interference experienced by a UE served by victim Node BS-B, a location of a UE served by victim node BS-B, a geometry of a UE served by victim node BS-B, measurement of an uplink transmission received from a UE served by victim node BS-B, channel quality information received from a UE served by victim node BS-B, and/or a neighbor cell measurement received from a UE served by victim node BS-B.

Figure 12:
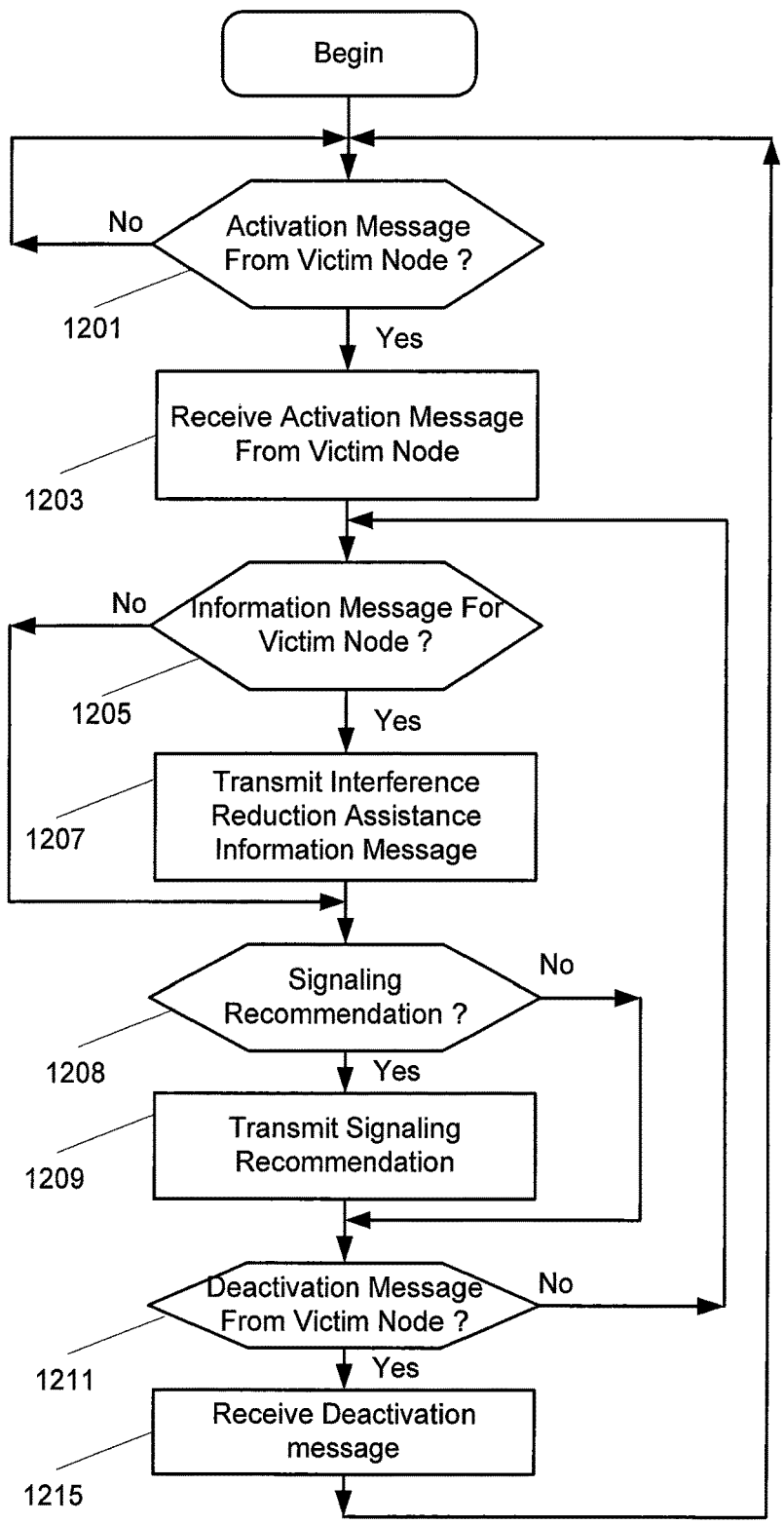
FIG. 12 is a flow chart illustrating aggressor node operations of FIG. 7 according to some embodiments of inventive concepts.

FIG. 12 is a flow chart illustrating aggressor node BS-A operations of FIG. 7 supporting inter-node interference reduction according to some embodiments of inventive concepts. At blocks 1201 and 1203, processor 903 may receive an interference reduction report activation message through network interface 905 from victim node BS-B (e.g., as an element of a Load Information message over an X2 interface). The interference reduction report active message may be transmitted by victim node BS-B as discussed above with respect to operations 1101 and 1103 of FIG. 11.

After receiving the interference reduction report activation message, processor 903 may transmit an interference reduction assistance information message through network interface 905 to the victim node BS-B at blocks 1205 and 1207 (e.g., as an element of a Load Information message over an X2 interface). The interference reduction assistance information message may be received at victim node BS-B as discussed above with respect to blocks 1105 and 1107. Moreover, the interference reduction assistance information message may include information based on downlink transmissions from aggressor node BS-A.

At blocks 1208 and 1209, processor 903 may transmit a signaling recommendation through network interface 905 to victim node BS-B, and the signaling recommendation may be received by victim node BS-B as discussed above with respect to blocks 1110 and 1111. As discussed above, the signaling recommendation may used to indicate that the interference reduction assistance information of block 1207 is no longer valid.

At block 1211, processor 903 may loop through operations of blocks 1205, 1207, 1208, 1209, and 1211 until a deactivation message is received from victim node BS-B at block 1211. Responsive to receiving such a deactivation message at blocks 1211 and 1215 (e.g., as an element of a Load Information message over an X2 interface), processor 903 may discontinue interference reduction assistance information messages until a next activation message is received at block 1201.

Figure 13:
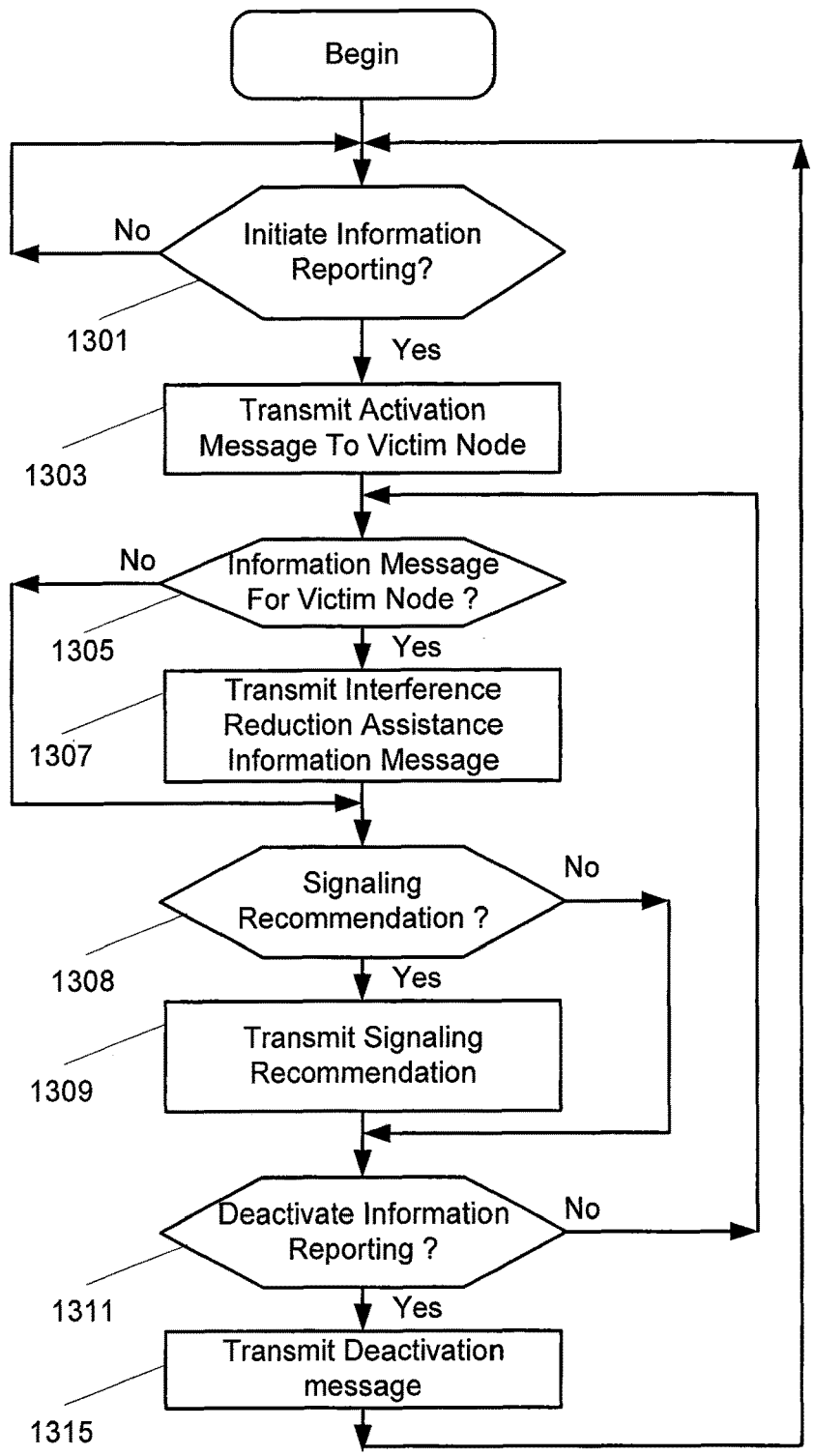
FIG. 13 is a flow chart illustrating aggressor node operations of FIG. 6 according to some embodiments of inventive concepts.

FIG. 13 is a flow chart illustrating operations of aggressor node BS-A of FIG. 6 according to some embodiments of inventive concepts. Responsive to initiating information reporting at block 1301, processor 903 of aggressor node BS-A may transmit an interference reduction report activation message through network interface 905 to victim node (BS-B) at block 1303 (e.g., as an element of a Load Information message over an X2 interface). Processor 903 may transmit the interference reduction report activation message responsive to an evaluation of a benefit of initiating interference reduction. The evaluation, for example, may be based on at least one of a level of interference generated by aggressor node BS-A with respect to victim node BS-B, a location of a UE served by aggressor node BS-A, a geometry of a UE served by aggressor node BS-A, a downlink transmission power of aggressor node BS-A, a data format of a downlink transmission of aggressor node BS-A, and/or expected mobility of a UE served by aggressor node BS-A.

After transmitting the interference reduction report activation message, processor 903 may transmit an interference reduction assistance information message through network interface 905 to victim node BS-B at blocks 1305 and 1307 (e.g., as an element of a Load Information message over an X2 interface). The interference reduction assistance information message may include information based on downlink transmissions from the aggressor node BS-A. For example, the interference reduction assistance information message may include a network assisted interference cancellation (NAIC) assistance information message. Moreover, the interference reduction assistance information may include at least one of a cell identification, cell specific reference signal interference cancelation information, power offset information, used Transmission Modes in eNodeB information, resource allocation and precoding granularity information, MBSFN subframe configuration information, resource blocks used, and/or modulation/coding scheme information.

At blocks 1308 and 1309, processor 903 may transmit a signaling recommendation through network interface 905 to victim node BS-B. The signaling recommendation may used to indicate that the interference reduction assistance information of block 1307 is no longer valid.

At block 1311, processor 903 may loop through operations of blocks 1305, 1307, 1308, 1309, and 1311 until information reporting is to be deactivated at block 1311. Responsive to determining that information reporting should be deactivated at block 1311, processor 903 may transmit an interference reduction report deactivation message through network interface 905 to victim node BS-B (e.g., as an element of a Load Information message over an X2 interface). The interference reduction report deactivation message may be transmitted responsive to an evaluation of a benefit of continuing interference reduction. The evaluation, for example, may be based on at least one of a level of interference generated by aggressor node BS-A with respect to victim node BS-B, a location of a UE served by aggressor node BS-A, a geometry of a UE served by aggressor node BS-A, a downlink transmission power of aggressor node BS-A, a data format of a downlink transmission of aggressor node BS-A, and/or expected mobility of a UE served by aggressor node BS-A.

Figure 14:
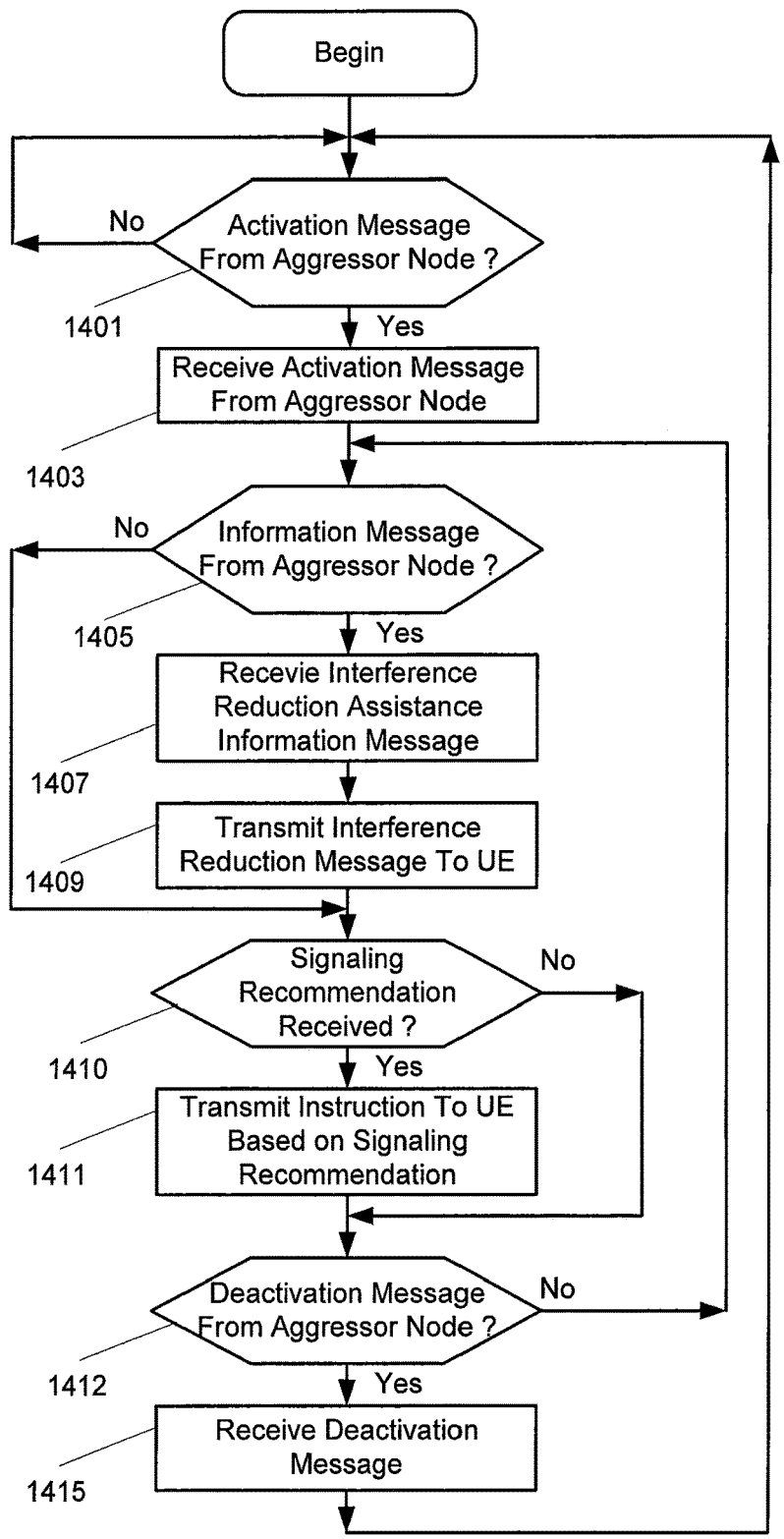
FIG. 14 is a flow chart illustrating victim node operations of FIG. 6 according to some embodiments of inventive concepts.

FIG. 14 is a flow chart illustrating victim node operations BS-B of FIG. 6 according to some embodiments of inventive concepts. At blocks 1401 and 1403, processor 903 of victim node BS-B may receive an interference reduction report activation message through network interface from aggressor node BS-A (e.g., as an element of a Load Information message over an X2 interface). Such activation messages may be transmitted from aggressor node BS-A as discussed above with respect to blocks 1301 and 1305.

After receiving the interference reduction report activation message, processor 903 may receive an interference reduction assistance information message through network interface 905 from aggressor node BS-A at blocks 1405 and 1407. The interference reduction assistance information message may be transmitted from aggressor node BS-A as discussed above with respect to blocks 1305 and 1307. Responsive to receiving the interference reduction assistance information message, processor 903 may transmit at least an element of the interference reduction assistance information message through transceiver 901 to a user equipment node UE served by victim node BS-B.

If an over the air signaling recommendation for the interference reduction assistance information message is received through network interface 905 from aggressor node BS-A at block 1410, processor 903 may transmit an instruction through transceiver 901 to the UE based on the signaling recommendation at block 1411. For example, the signaling recommendation may be used to indicate that the interference reduction assistance information of block 1407 is no longer valid, and the instruction of block 1411 may be for the UE to discontinue interference reduction/cancellation until a next interference reduction message is provided. The signaling recommendation may be transmitted from aggressor node BS-A as discussed above with respect to blocks 1308 and 1309.

At block 1412, processor 903 may loop through operations of blocks 1405, 1407, 1409, 1410, 1411, and 1412 until a deactivation message is received through network interface 905 from aggressor node BS-A at blocks 1412 and 1415. Responsive to receiving such a deactivation message at blocks 1411 and 1415 (e.g., as an element of a Load Information message over an X2 interface), processor 903 may discontinue interference reduction until a next activation message is received at block 1401. The deactivation message may be transmitted from aggressor node BS-A as discussed above with respect to blocks 1311 and 1315.

The deactivation message of blocks 1311-1315 and/or 1412-1415 may be a message transmitted from aggressor node BS-A to victim node BS-B to invalidate interference reduction assistance information. The deactivation message may thus indicate that previously transmitted/received interference reduction assistance information from aggressor node BS-A is invalid.

Example Embodiments

Embodiment 1. A method at a first network node supporting inter-node interference reduction, the method comprising: communicating an interference reduction report activation message between the first network node and a second network node; after communicating the interference reduction report activation message, communicating an interference reduction assistance information message between the first and second network nodes; and after communicating the interference reduction assistance information message, communicating an interference reduction report deactivation message between the first and second network nodes.

Embodiment 2. The method according to Embodiment 1, wherein communicating the interference reduction report activation message comprises transmitting the interference reduction report activation message from the first network node to the second network node, wherein communicating the interference reduction assistance information message comprises receiving the interference reduction assistance information message at the first network node from the second network node, and wherein communicating the interference reduction report deactivation message comprises transmitting the interference reduction report deactivation message from the first network node to the second network node, the method further comprising: transmitting at least an element of the interference reduction assistance information message from the first network node to a user equipment node served by the first network node.

Embodiment 3. The method according to Embodiment 2 wherein the interference reduction assistance information message comprises information based on downlink transmissions from the second network node.

Embodiment 4. The method according to any of Embodiments 2-3 wherein transmitting the interference reduction report activation message comprises transmitting the interference reduction report activation message responsive to an evaluation of a benefit of initiating interference reduction.

Embodiment 5. The method according to Embodiment 4 the evaluation is based on at least one of a number of interference reduction capable UEs served by the first network node that are active, interference experienced by a UE served by the first network Node, a location of a UE served by the first network node, a geometry of a UE served by the first network node, measurement of an uplink transmission received from a UE served by the first network node, channel quality information received from a UE served by the first network node, and/or a neighbor cell measurement received from a UE served by the first network node.

Embodiment 6. The method according to any of Embodiments 2-5 wherein transmitting the interference reduction report deactivation message comprises transmitting the interference reduction report deactivation message responsive to an evaluation of a benefit of continuing interference reduction.

Embodiment 7. The method according to Embodiment 6 the evaluation is based on at least one of a number of interference reduction capable UEs served by the first network node that are active, interference experienced by a UE served by the first network Node, a location of a UE served by the first network node, a geometry of a UE served by the first network node, measurement of an uplink transmission received from a UE served by the first network node, channel quality information received from a UE served by the first network node, and/or a neighbor cell measurement received from a UE served by the first network node.

Embodiment 8. The method according to Embodiment 1, wherein communicating the interference reduction report activation message comprises receiving the interference reduction report activation message at the first network node from the second network node, wherein communicating the interference reduction assistance information message comprises transmitting the interference reduction assistance information from the first network node to the second network node, and wherein communicating the interference reduction report deactivation message comprises receiving the interference reduction report deactivation message at the first network node from the second network node.

Embodiment 9. The method according to Embodiment 8 wherein the interference reduction assistance information message comprises information based on downlink transmissions from the first network node.

Embodiment 10. The method according to Embodiment 1, wherein communicating the interference reduction report activation message comprises transmitting the interference reduction report activation message from the first network node to the second network node, wherein communicating the interference reduction assistance information message comprises transmitting the interference reduction assistance information from the first network node to the second network node, and wherein communicating the interference reduction report deactivation message comprises transmitting the interference reduction report deactivation message from the first network node to the second network node.

Embodiment 11. The method according to Embodiment 10 wherein the reduction assistance information message comprises information based on downlink transmissions from the first network node.

Embodiment 12. The method according to any of Embodiments 10-11 wherein transmitting the interference reduction report activation message comprises transmitting the interference reduction report activation message responsive to an evaluation of a benefit of initiating interference reduction.

Embodiment 13. The method according to Embodiment 12 the evaluation is based on at least one of a level of interference generated by the first network node with respect to the second network node, a location of a UE served by the first network node, a geometry of a UE served by the first network node, a downlink transmission power of the first network node, a data format of a downlink transmission of the first network node, and/or expected mobility of a UE served by the first network node.

Embodiment 14. The method according to any of Embodiments 10-13 wherein transmitting the interference reduction report deactivation message comprises transmitting the interference reduction report deactivation message responsive to an evaluation of a benefit of continuing interference reduction.

Embodiment 15. The method according to Embodiment 14 the evaluation is based on at least one of a level of interference generated by the first network node with respect to the second network node, a location of a UE served by the first network node, a geometry of a UE served by the first network node, a downlink transmission power of the first network node, a data format of a downlink transmission of the first network node, and/or expected mobility of a UE served by the first network node.

Embodiment 16. The method according to Embodiment 1, wherein communicating the interference reduction report activation message comprises receiving the interference reduction report activation message at the first network node from the second network node, wherein communicating the interference reduction assistance information message comprises receiving the interference reduction assistance information at the first network node from the second network node, and wherein communicating the interference reduction report deactivation message comprises receiving the interference reduction report deactivation message at the first network node from the second network node, the method further comprising: transmitting at least an element of the interference reduction assistance information message from the first network node to a user equipment node served by the first network node.

Embodiment 17. The method according to Embodiment 16 wherein the reduction assistance information message comprises information based on downlink transmissions from the first network node.

Embodiment 18. The method according to any of Embodiments 1-17, wherein the interference reduction assistance information message comprises a Network Assisted Interference Cancellation, NAIC, assistance information message.

Embodiment 19. The method according to any of Embodiments 1-18, wherein the interference reduction assistance information message comprises at least one of a cell identification, cell specific reference signal interference cancelation information, power offset information, used Transmission Modes in eNodeB information, resource allocation and precoding granularity information, MBSFN subframe configuration information, resource blocks used, and/or modulation/coding scheme information.

Embodiment 20. The method according to any of Embodiments 1-19, wherein each of the interference reduction report activation message, the interference reduction assistance information message, and the interference reduction report deactivation message is communicated over an X2 interface between the first and second network nodes.

Embodiment 21. The method according to any of Embodiments 1-20, wherein each of the interference reduction report activation message, the interference reduction assistance information message, and the interference reduction report deactivation message is communicated as an element of a Load Information message.

Embodiment 22. The method according to any one of Embodiments 1-21, the method further comprising: communicating an over the air signaling recommendation for the interference reduction assistance information message between the first and second network nodes.

Embodiment 23. A method at a first network node supporting inter-node interference reduction, the method comprising: communicating an interference reduction assistance information message between the first network node and a second network node; and communicating an over the air signaling recommendation for the interference reduction assistance information message between the first and second network nodes.

Embodiment 24. The method according to any of Embodiments 23 wherein the interference reduction assistance information message is a first interference reduction assistance information message and wherein the over the air signaling recommendation is a first over the air signaling recommendation, the method further comprising: after communicating the first interference reduction assistance information message, communicating a second interference reduction assistance information message between the first and network nodes; and after communicating the first over the air signaling recommendation, communicating a second over the air signaling recommendation for the second interference reduction assistance information message between the first and second network nodes wherein the first and second over the air signaling recommendations are different.

Embodiment 25. The method according to Embodiment 24 wherein communicating the first and second interference reduction assistance information messages comprises transmitting the first and second interference reduction assistance information messages from the first network node to the second network node, and wherein communicating the first and second over the air signaling recommendations comprises transmitting the first and second over the air signaling recommendation from first node to the second node.

Embodiment 26. The method according to Embodiment 25 wherein the first over the air signaling recommendation is determined based on an evaluation of interference reduction using the first interference reduction assistance information message, and wherein the second over the air signaling recommendation is determined based on an evaluation of interference reduction using the second interference reduction assistance information message.

Embodiment 27. The method according to Embodiment 26 wherein each of the evaluations of interference reduction is based on at least one of an estimation of interference generated by the first network node toward UEs of the second network node, a modulation order of a downlink transmission from the first network node, a data rate of a downlink transmission from the first network node, a likelihood of UEs of the second network node decoding downlink transmission from the first network node, and/or a downlink transmission power of the first network node.

Embodiment 28. The method according to Embodiment 24 wherein communicating the first and second interference reduction assistance information messages comprises receiving the first and second interference reduction assistance information messages at the first network node from the second network node, and wherein communicating the first and second over the air signaling recommendations comprises receiving the first and second over the air signaling recommendations at the first node from the second node.

Embodiment 29. The method according to Embodiment 28 further comprising: responsive to receiving the first over the air signaling recommendation, transmitting at least an element of the first interference reduction assistance information message from the first network node over a wireless interface to a user equipment node served by the first network node; and responsive to receiving the second over the air signaling recommendation, blocking transmitting any element of the second interference reduction assistance information message from the first network node over the wireless interface to the user equipment node served by the first network node.

Embodiment 30. The method according to any of Embodiments 23-29 wherein the over the air signaling recommendation comprises a binary information element indicating a positive or negative recommendation.

Embodiment 31. The method according to any of Embodiments 23-30 wherein the over the air signaling recommendation comprises a weight factor indicating one of at least 8 different recommendation values.

Embodiment 32. The method according to any of Embodiments 23-31 wherein the over the air signaling recommendation comprises an information element indicating at least one of three different recommendation values.

Embodiment 33. The method according to any of Embodiments 23-32, wherein the interference reduction assistance information message comprises a Network Assisted Interference Cancellation, NAIC, assistance information message.

Embodiment 34. The method according to any of Embodiments 23-33, wherein the interference reduction assistance information message comprises at least one of a cell identification, cell specific reference signal interference cancelation information, power offset information, used Transmission Modes in eNodeB information, resource allocation and precoding granularity information, MBSFN subframe configuration information, resource blocks used, and/or modulation/coding scheme information.

Embodiment 35. The method according to any of Embodiments 23-34, wherein the interference reduction assistance information message and the over the air signaling recommendation are communicated over an X2 interface between the first and second network nodes.

Embodiment 36. The method according to any of Embodiments 23-35, wherein the interference reduction assistance information message and the over the air signaling recommendation are communicated as elements of a Load Information message.

Embodiment 37. A method performed in a network node to activate and deactivate NAIC assistance information signaling.

Embodiment 38. The method in embodiment 37 where the activation and deactivation is based on evaluation of geometry of the active UEs at the aggressor node.

Embodiment 39. The method in embodiment 37, where the activation and deactivation is based on a general evaluation of interference generated towards the victim node by the active UEs at the aggressor node.

Embodiment 40. The method in embodiment 37 where the activation and deactivation is based on evaluation on served UEs at victim node such as UE support for NAIC, UE geometry, UE radio and traffic conditions.

Embodiment 41. The method in embodiment 37 where both the aggressor and the victim node can trigger activation/deactivation commands.

Embodiment 42. A method performed in a network node to provide a weight or benefit indication of the NAIC assistance information signaled.

Embodiment 43. The method in embodiment 42 where the weight of benefit indication is provided by the aggressor node.

Embodiment 44. The method in embodiment 42 where the victim node decides whether to signal the NAIC assistance information over the air or not depending on the weight of benefit indication.

Embodiment 45. A method performed in a network node to recommend the UE's which are capable of NAIC not to use NAIC.

Embodiment 46. A method performed between two network nodes consisting of signaling an invoke indication requesting start of NAIC assistance information reporting.

Embodiment 47. A method performed between two network nodes consisting of signaling via an available inter node interface NAIC assistance information reporting start/stop messages.

Embodiment 48. A method performed between two network nodes consisting of signaling via an available inter node interface NAIC assistance information weight or benefit indication messages.

Embodiment 49. The method of any of embodiments 46-48 where the inter node interface is an X2 interface and the network nodes are eNBs.

Embodiment 50. The method of any of embodiments 46-49 where the X2 message used to transport NAIC assistance information indications is the X2: LOAD INFORMATION message.

Embodiment 51. The method of embodiment 37, in which the activation and deactivation of NAIC signaling is signaled to at least 1 NAICS capable UE served by a victim cell.

Embodiment 52. A network node of a radio access network, the network node comprising: a network interface configured to provide communications between the network node and other network nodes; a transceiver configured to provide wireless communications between the network node and user equipment nodes served by the network node; and a processor coupled to the network node and the transceiver, wherein the processor is configured to perform methods according to any of embodiments 1-51 wherein communications with another network node are provided through the network interface and wherein communications with user equipment nodes served by the network node are provided through the transceiver.

Embodiment 53. A network node of a radio access network, wherein the network node is adapted to perform according to any one of Embodiments 1-51.

Embodiment 54. A first network node for use in a radio access network, wherein the first network node is adapted to: communicate an interference reduction report activation message between the first network node and a second network node; communicate an interference reduction assistance information message between the first and second network nodes after communicating the interference reduction report activation message; and communicate an interference reduction report deactivation message between the first and second network nodes after communicating the interference reduction assistance information message.

Embodiment 55. A first network node according to Embodiment 54, wherein the first network node is adapted to perform according to any one of Embodiments 2-22.

Embodiment 56. A first network node for use in a radio access network, RAN, wherein the first network node is adapted to: communicate an interference reduction assistance information message between the first network node and a second network node; and communicate an over the air signaling recommendation for the interference reduction assistance information message between the first and second network nodes.

Embodiment 57. A first network node according to Embodiment 56, wherein the first network node is adapted to perform according to any one of Embodiments 24-36.

Embodiment 58. A first network node of a radio access network, RAN, the first network node comprising: a network interface configured to provide communications between the first network node and other network nodes; a transceiver configured to provide wireless communications between the first network node and user equipment nodes served by the first network node; and a processor coupled to the network interface and the transceiver, wherein communications with another network node are provided through the network interface and wherein communications with user equipment nodes served by the network node are provided through the transceiver, and wherein the processor is configured to, communicate an interference reduction report activation message through the network interface between the first network node and a second network node, communicate an interference reduction assistance information message through the network interface between the first and second network nodes after communicating the interference reduction report activation message, and communicate an interference reduction report deactivation message through the network interface between the first and second network nodes after communicating the interference reduction assistance information message.

Embodiment 59. A first network node according to Embodiment 58, wherein the processor is configured to perform according to any one of Embodiments 2-22.

Embodiment 60. A first network node of a radio access network, the first network node comprising: a network interface configured to provide communications between the first network node and other network nodes; a transceiver configured to provide wireless communications between the first network node and user equipment nodes served by the first network node; and a processor coupled to the network interface and the transceiver, wherein communications with another network node are provided through the network interface, wherein communications with user equipment nodes served by the first network node are provided through the transceiver, and wherein the processor is configured to, communicate an interference reduction assistance information message through the network interface between the first network node and a second network node, and communicate an over the air signaling recommendation for the interference reduction assistance information message through the network interface between the first and second network nodes.

Embodiment 61. A first network node according to Embodiment 60, wherein the processor is configured to perform according to any one of Embodiments 24-36.

Embodiment 62. A first network node comprising: means for communicating an interference reduction report activation message between the first network node and a second network node; means for communicating an interference reduction assistance information message between the first and second network nodes after communicating the interference reduction report activation message; and means for communicating an interference reduction report deactivation message between the first and second network nodes after communicating the interference reduction assistance information message.

Embodiment 63. A first network node comprising: means for communicating an interference reduction assistance information message between the first network node and a second network node; and means for communicating an over the air signaling recommendation for the interference reduction assistance information message between the first and second network nodes.

The means of the first network nodes according to Embodiments 62 and 63 above may in some embodiments be implemented as computer programs stored in memory (e.g. in the memory circuit 907 in FIG. 9) for execution by processors (e.g. the processor circuit 903 of FIG. 9).

ABBREVIATIONS

MSC Mobile Switching Center
MME Mobility Management Entity
MDT Minimization of Drive Tests
E-SMLC Enhanced Serving Mobile Location Center
HSDPA High Speed Downlink Packet Access
HS-SCCH High speed shared control channel
HS-PDSCH High speed Physical data shared channel
HARQ Hybrid automatic repeat request
CRC Cyclic redundancy check
CRS-IC Common Reference Signal Interference Cancelation
NAK non-acknowledgement
ACK acknowledgement
CC Chase combining
IR Incremental Redundancy
UE User Equipment
CQI Channel quality information
MMSE Minimum Mean Square Error
TTI Transmit Time Interval
PCI Precoding control index
O&M Operational and Maintenance
OSS Operational Support Systems
SON Self Organizing Network
DC-HSDPA Dual cell HSDPA
DC-HSUPA Dual cell HSUPA
MC-HSPA Multi-carrier HSPA
RRC Radio resource control
MAC Medium access control
BS Base Station
CID Cell Identity
DAS Distributed Antenna System
DL Downlink
ID Identity
L1 Layer 1
L2 Layer 2
LTE Long Term Evolution
MAC Medium Access Control
OFDM Orthogonal Frequency Division Multiplexing
PBCH Physical Broadcast Channel
PCFICH Physical Control format Indicator
PDCCH Physical Downlink Control Channel
PDSCH Physical Downlink Shared Channel
PHICH Physical Hybrid ARQ Indicator Channel
RB Resource Block
RRH Remote radio head
RRM Radio Resource Management
RRU Remote radio unit
RSRQ Reference signal received quality
RSRP Reference signal received power
SFN Single Frequency Network
SRS Sounding Reference Signal
SSS Secondary Synchronization Signal
UE User Equipment
UL Uplink
RSTD Reference signal time difference
SON Self Organizing Network
RSSI Received signal strength indicator
O&M Operational and Maintenance
OSS Operational Support Systems
OTDOA Observed time difference of arrival

FURTHER DEFINITIONS

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

The invention claimed is:

1. A method at a first network node supporting inter-node interference reduction, the method comprising:
    transmitting an interference reduction report activation message from the first network node to a second network node;
    after transmitting the interference reduction report activation message, receiving an interference reduction assistance information message at the first network node from the second network node;
    transmitting at least an element of the interference reduction assistance information message from the first network node to a user equipment node served by the first network node; and
    after receiving the interference reduction assistance information message, transmitting an interference reduction report deactivation message from the first network node to the second network node.

2. A first network node of a radio access network (RAN), the first network node comprising:
    a network interface configured to provide communications between the first network node and other network nodes;
    a transceiver configured to provide wireless communications between the first network node and user equipment nodes (UEs) served by the first network node; and
    a processor coupled to the network interface and the transceiver wherein communications with another network node are provided through the network interface and wherein communications with user equipment nodes (UEs) served by the network node are provided through the transceiver, and wherein the processor is configured to,
    transmit an interference reduction report activation message through the network interface from the first network node to a second network node,
    receive an interference reduction assistance information message at the first network node from the second network node through the network interface after transmitting the interference reduction report activation message, transmit at least an element of the interference reduction assistance information message from the first network node to a user equipment node served by the first network node; and transmit an interference reduction report deactivation message through the network interface from the first network node to the second network node after receiving the interference reduction assistance information message.

3. The first network node according to claim 2 wherein the interference reduction assistance information message comprises information based on downlink transmissions from the second network node.

4. The first network node according to claim 2 wherein the processor is configured to transmit the interference reduction report activation message by transmitting the interference reduction report activation message responsive to an evaluation of a benefit of initiating interference reduction.

5. The first network node according to claim 4 wherein the evaluation is based on at least one of,
   a number of interference reduction capable UEs served by the first network node that are active,
   interference experienced by a UE served by the first network Node,
   a location of the UE served by the first network node,
   a geometry of the UE served by the first network node,
   measurement of an uplink transmission received from the UE served by the first network node,
   channel quality information received from the UE served by the first network node, and
   a neighbor cell measurement received from the UE served by the first network node.

6. The first network node according to claim 2 wherein the processor is configured to transmit the interference reduction report deactivation message by transmitting the interference reduction report deactivation message responsive to an evaluation of a benefit of continuing interference reduction.

7. The first network node according to claim 6 wherein the evaluation is based on at least one of,
   a number of interference reduction capable UEs served by the first network node that are active,
   interference experienced by a UE served by the first network Node,
   a location of the UE served by the first network node,
   a geometry of the UE served by the first network node,
   measurement of an uplink transmission received from the UE served by the first network node,
   channel quality information received from the UE served by the first network node, and
   a neighbor cell measurement received from the UE served by the first network node.

8. The first network node according to claim 2, wherein the interference reduction assistance information message comprises a Network Assisted Interference Cancellation (NAIC) assistance information message.

9. The first network node according to claim 2, wherein the interference reduction assistance information message comprises at least one of,
   a cell identification,
   cell specific reference signal interference cancelation information,
   power offset information,
   used Transmission Modes in eNodeB information,
   resource allocation and precoding granularity information,
   MBSFN subframe configuration information,
   resource blocks used, and
   modulation/coding scheme information.

10. The first network node according to claim 2, wherein each of the interference reduction report activation message, the interference reduction assistance information message, and the interference reduction report deactivation message is communicated over an X2 interface between the first network node and the second network node.

11. The first network node according to claim 2, wherein each of the interference reduction report activation message, the interference reduction assistance information message, and the interference reduction report deactivation message is communicated as an element of a Load Information message.

12. The first network node according to claim 2, wherein the processor is further configured to:
   communicate an over the air signaling recommendation for the interference reduction assistance information message between the first network node and the second network node.

13. The method according to claim 1, wherein the interference reduction assistance information message comprises information based on downlink transmissions from the second network node.

14. A method at a first network node supporting inter-node interference reduction, the method comprising:
   transmitting an interference reduction report activation message from the first network node to a second network node;
   after transmitting the interference reduction report activation message, receiving an interference reduction assistance information message at the first network node from the second network node; and
   transmitting at least an element of the interference reduction assistance information message from the first network node to a user equipment node served by the first network node.

15. The method according to claim 14, wherein the interference reduction assistance information message comprises information based on downlink transmissions from the second network node.

16. The method according to claim 14, wherein each of the interference reduction report activation message and the interference reduction assistance information message is communicated over an X2 interface between the first network node and the second network node.

17. A first network node of a radio access network (RAN), the first network node comprising:
   a network interface configured to provide communications between the first network node and other network nodes;
   a transceiver configured to provide wireless communications between the first network node and user equipment nodes (UEs) served by the first network node; and
   a processor coupled to the network interface and the transceiver wherein communications with another network node are provided through the network interface and wherein communications with user equipment nodes (UEs) served by the network node are provided through the transceiver, and wherein the processor is configured to,
   transmit an interference reduction report activation message through the network interface from the first network node to a second network node, receive an interference reduction assistance information message at the first network node from the second network node through the network interface after transmitting the interference reduction report activation message, and transmit at least an element of the interference reduction assistance information message through the network interface from the first network node to a user equipment node served by the first network node.

18. The first network node according to claim 17 wherein the interference reduction assistance information message comprises information based on downlink transmissions from the second network node.

19. The first network node according to claim 17 wherein the processor is configured to transmit the interference reduction report activation message by transmitting the interference reduction report activation message responsive to an evaluation of a benefit of initiating interference reduction.

20. The first network node according to claim 19, wherein the evaluation is based on at least one of,
a number of interference reduction capable UEs served by the first network node that are active,
interference experienced by a UE served by the first network Node,
a location of the UE served by the first network node,
a geometry of the UE served by the first network node,
measurement of an uplink transmission received from the UE served by the first network node,
channel quality information received from the UE served by the first network node, and
a neighbor cell measurement received from the UE served by the first network node.

21. The first network node according to claim 17, wherein the interference reduction assistance information message comprises a Network Assisted Interference Cancellation (NAIC) assistance information message.

22. The first network node according to claim 17, wherein the interference reduction assistance information message comprises at least one of,
a cell identification,
cell specific reference signal interference cancelation information,
power offset information,
used Transmission Modes in eNodeB information,
resource allocation and precoding granularity information,
MBSFN subframe configuration information,
resource blocks used, and
modulation/coding scheme information.

23. The first network node according to claim 17, wherein each of the interference reduction report activation message and the interference reduction assistance information message is communicated over an X2 interface between the first network node and the second network node.

24. The first network node according to claim 17, wherein each of the interference reduction report activation message and the interference reduction assistance information message, is communicated as an element of a Load Information message.

25. The first network node according to claim 17, wherein the processor is further configured to:
communicate an over the air signaling recommendation for the interference reduction assistance information message between the first network node and the second network node.

* * * * *

UNITED STATES PATENT AND TRADEMARK OFFICE
CERTIFICATE OF CORRECTION

PATENT NO. : 10,051,515 B2  
APPLICATION NO. : 14/786091  
DATED : August 14, 2018  
INVENTOR(S) : Centonza et al.

Page 1 of 1

It is certified that error appears in the above-identified patent and that said Letters Patent is hereby corrected as shown below:

In the Specification

Column 1, Lines 30-31, delete "Time division duplex (TOD)" and insert -- Time division duplex (TDD) --, therefor.

Column 11, Line 62, delete "base stations (ES)," and insert -- base stations (BS), --, therefor.

Column 11, Line 63, delete "MSR ES," and insert -- MSR BS, --, therefor.

Column 14, Line 8, delete "ES-A" and insert -- BS-A --, therefor.

Column 15, Line 4, delete "13S-A," and insert -- BS-A, --, therefor.

Column 19, Line 13, delete "13S-A." and insert -- BS-A. --, therefor.

Column 19, Line 15, delete "ES-B" and insert -- BS-B --, therefor.

Column 22, Line 30, delete "(e.g., ES-B)." and insert -- (e.g., BS-B). --, therefor.

Column 26, Line 54, delete "may used" and insert -- may be used --, therefor.

Column 27, Line 37, delete "may used" and insert -- may be used --, therefor.

Signed and Sealed this  
Fifteenth Day of October, 2019

Andrei Iancu  
*Director of the United States Patent and Trademark Office*